United States Patent [19]
Zhu et al.

[11] Patent Number: 5,581,635
[45] Date of Patent: Dec. 3, 1996

[54] METHOD AND SYSTEM FOR FAST ROTATION OF RUN-LENGTH ENCODED IMAGES

[75] Inventors: Jie Zhu, Oxdord; Michael C. Moed, Ridgefield; Izrail S. Gorian, Bethel, all of Conn.

[73] Assignee: United Parcel Service of America, Inc., Atlanta, Ga.

[21] Appl. No.: 507,793

[22] Filed: Jul. 25, 1995

[51] Int. Cl.$^6$ .................................................... G06K 9/00
[52] U.S. Cl. ........................................ 382/245; 382/235
[58] Field of Search .................................. 382/232, 233, 382/235, 239, 243, 244, 245, 246, 251, 252, 253, 276, 277, 293, 295, 296, 297, 298, 299, 300; 358/443, 448, 452, 426, 427, 428, 261.1, 261.2, 261.3, 261.4, 262.1

[56] References Cited

U.S. PATENT DOCUMENTS

| | | | |
|---|---|---|---|
| 4,554,638 | 11/1985 | Iida | 364/521 |
| 4,611,232 | 9/1986 | Searby | 358/160 |
| 4,783,834 | 11/1988 | Anderson et al. | 382/46 |
| 4,792,981 | 12/1988 | Cahill, III et al. | 382/56 |
| 4,827,413 | 5/1989 | Baldwin et al. | 364/413.19 |
| 4,878,124 | 10/1989 | Tsujimoto et al. | 358/443 |
| 4,912,559 | 3/1990 | Ariyoshi et al. | 358/261.1 |
| 4,985,849 | 1/1991 | Hideaki | 364/518 |
| 5,008,951 | 4/1991 | Koshi | 382/245 |
| 5,124,692 | 6/1992 | Sasson | 340/727 |
| 5,412,197 | 5/1995 | Smith | 235/462 |
| 5,418,862 | 5/1995 | Zheng et al. | 382/199 |

FOREIGN PATENT DOCUMENTS

| | | | |
|---|---|---|---|
| 2-56081 | 2/1990 | Japan | G06K 9/32 |
| 4-296983 | 10/1992 | Japan | G06F 15/66 |
| 5-313636 | 11/1993 | Japan | G09G 5/24 |
| 5-324916 | 12/1993 | Japan | G06K 9/62 |
| 6-30240 | 2/1994 | Japan | H04N 1/387 |

*Primary Examiner*—Leo Boudreau
*Assistant Examiner*—Bijan Tadayon
*Attorney, Agent, or Firm*—Jones & Askew

[57] ABSTRACT

A method and system including a high speed computer algorithm for rotating images stored in a computer memory, such as those captured by a CCD array. The method and system may be used with an over-the-belt optical character recognition (OCR) reader that captures a pixelized image of the surface of a parcel as it moves along a conveyor. A run-length encoded output image is obtained from a run-length encoded input image, wherein the output image is a rotated version of the input image. A predefined pixel mapping sequence for a rotation angle with a rational tangent is used to map image pixel data. Mapping image pixel data using a predefined pixel mapping sequence allows rotation without floating point computations, and allows the use of a reverse pixel mapping technique to map output runs from an input image in order to avoid the creation of holes or artifacts in the output image. Mapped output runs are scaled to preserve the aspect ratio of the rotated image. The order of processing the elements of the input run-length input table is selected so as to directly create a run-length encoded output table.

32 Claims, 14 Drawing Sheets

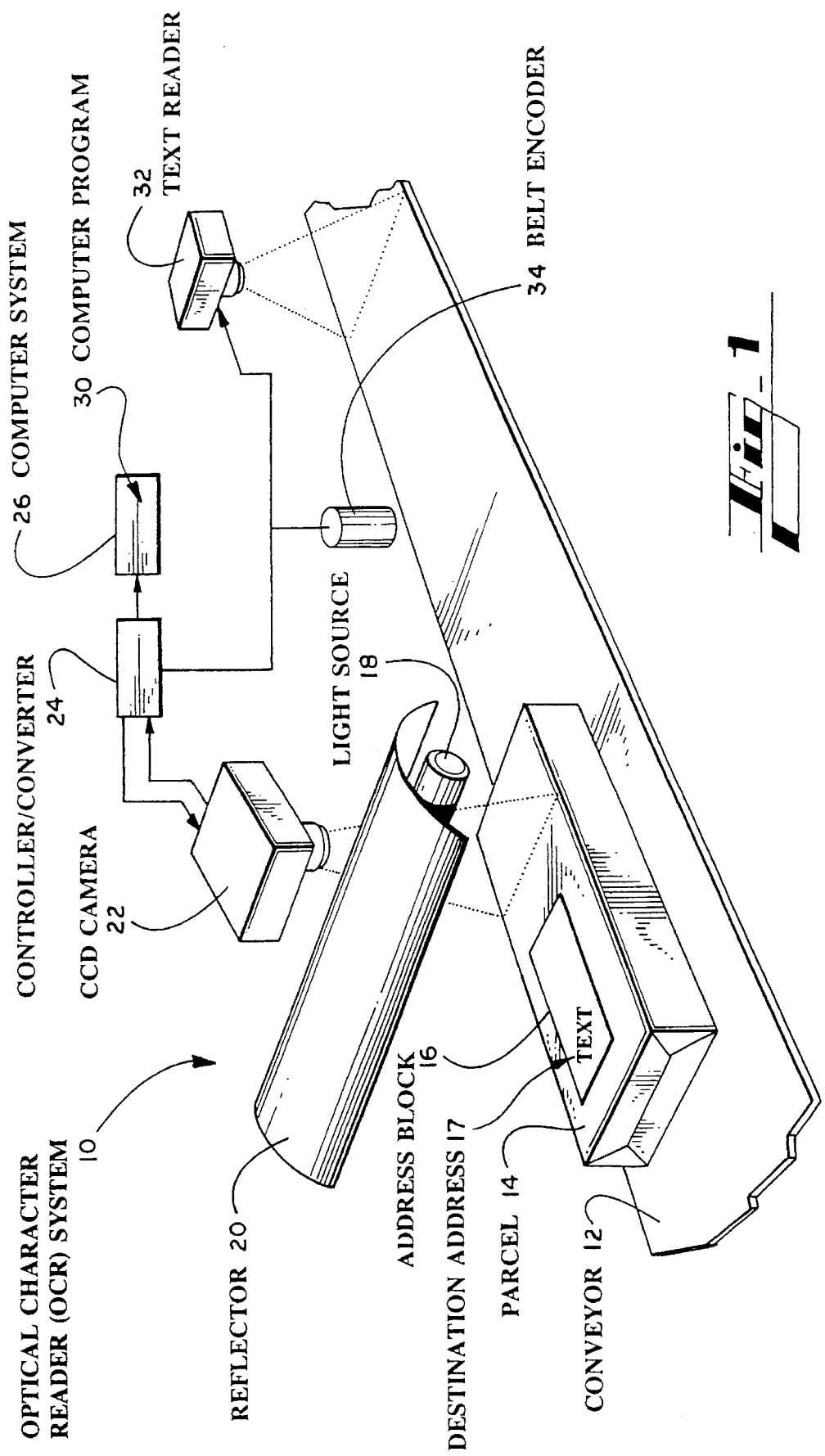

OCR System

Quadrant of Rotation Determines the Order for Reading the Run-Length Encoded Table Pixel Sequence
for Reading Input
Pixels Input Image

82

Output Image

Pixel Sequence
for Output Run

84

Input Image

|   |    |    |    |    |    |    |    |    |    |    |    |    |    |    |
|---|----|----|----|----|----|----|----|----|----|----|----|----|----|----|
| 1 | 11 | 12 | 13 | 14 | 15 | 16 | 17 | 18 | 19 | 20 | 21 | 22 | 23 | 24 | 25 |
| 2 |    |    |    |    |    |    |    |    |    |    |    |    |    |    |
| 3 |    |    |    |    |    |    |    |    |    |    |    |    |    |    |
| 4 |    |    |    |    |    |    |    |    |    |    |    |    |    |    |
| 5 |    |    |    |    |    |    |    |    |    |    |    |    |    |    |
| 6 |    |    |    |    |    |    |    |    |    |    |    |    |    |    |
| 7 |    |    |    |    |    |    |    |    |    |    |    |    |    |    |
| 8 |    |    |    |    |    |    |    |    |    |    |    |    |    |    |
| 9 |    |    |    |    |    |    |    |    |    |    |    |    |    |    |
| 10|    |    |    |    |    |    |    |    |    |    |    |    |    |    |

Mapping of Input Plane Edge Pixels to Output Plane

Output Row

| Intermediate Pixel Distance | Scaling Factor | Scaled Pixel Distance |
|---|---|---|
| 1 | 1.25 | 1 |
| 2 | 1.25 | 3 |
| 3 | 1.25 | 4 |
| 4 | 1.25 | 5 |
| 5 | 1.25 | 6 |
| 6 | 1.25 | 8 |
| 7 | 1.25 | 9 |

A,D,G → 4
H → 5
C,F,I → 6

METHOD AND SYSTEM FOR FAST ROTATION OF RUN-LENGTH ENCODED IMAGES

TECHNICAL FIELD

The present invention relates to image processing, and more particularly relates to over-the-belt optical character recognition readers. Specifically, the present invention relates to a method and system for rotating a run-length encoded pixelized image.

BACKGROUND OF THE INVENTION

For years, machines have been used to scan parcels as they move along a conveyor. Over-the-belt optical character recognition (OCR) readers have been recently developed that can capture an image of the surface of a parcel as it moves along a conveyor, and then create and process a representation of the image. The fundamental physical components of an OCR reader are a sensor, an analog-to-digital (A/D) converter, and a computer comprising a memory. The individual physical components of an OCR reader are all well known in the art, and many alternative embodiments of each of the individual physical components are commercially available, with differing cost and performance characteristics. Much effort goes into finding the most efficient combinations of components for particular applications, and in the development of computer software programs that process the images created by these familiar physical components.

Charge-coupled device (CCD) sensor arrays are often used in OCR readers. A CCD camera consists of an array of electronic "pixels," each of which stores an accumulated charge according to the amount of light that strikes the pixel. A CCD camera is used to quickly capture an image of the surface of a parcel as it moves along a conveyor. The image is converted into digital format which may be stored as a bit map in a computer memory. The CCD array is then reset by dissipating the charge within the pixels, and the array is ready to capture the image of another parcel or section of a parcel. In this manner, a single CCD camera is used to scan a great many parcels.

Computers that may be used to process the images captured by CCD cameras vary in computation speed and other parameters. Generally, a faster computer is more expensive than a slower computer, a computer with a large memory capacity is more expensive than a computer with a smaller memory capacity, and a special purpose computer is more expensive than a general purpose computer. There is therefore a financial motivation to use low speed, low memory, general purpose computers whenever such are suitable for a particular purpose.

Parcel delivery companies, such as United Parcel Service (UPS), could make extensive use of OCR reader systems. UPS ships millions of parcels every day. If OCR reader systems were used by parcel delivery companies such as UPS they would generate an enormous amount of computer data. As a result, there is a need for computer systems that can quickly and accurately process the images created by CCD cameras. For example, computer systems have been developed that can attempt to read the destination address written on certain parcels, so that the parcels may be correctly routed to their destinations when the address is successfully read. Reading text is a sophisticated task, and the systems capable of doing so are commensurately sophisticated and may comprise expensive equipment such as high speed, high memory, or special purpose computers.

To the extent that less expensive equipment can perform less sophisticated tasks in an OCR system, more expensive equipment can be dedicated to reading text. Rotating a text image is an example of a function required of an OCR reader system that can be performed with less sophisticated equipment than that which is required to read text. There is therefore a financial motivation to rotate a text image using a general purpose computer. Similarly, there is a financial motivation to store text image data in a compressed format that reduces the memory required to store the image, to rotate the compressed image, and to store the rotated image in a compressed format.

There are a number of well known image processing techniques that are used to capture and store in a computer memory an image of a parcel as it is conveyed by an OCR system. For example, a two-dimensional "pixelized image" or bit map matrix representing an image of the surface of the parcel may be captured and stored in the computer memory using a CCD line camera that includes a single line array of electronic pixels or a plurality of lines operated sequentially. For example, a two array CCD line camera may operate two lines sequentially, with one line capturing an image while the other is being discharged and reset to capture another image.

A column of the bit map may be built by capturing a binary representation of the pixels of a CCD line array that is exposed as the parcel passes under the camera. A conventional analog-to-digital (A/D) converter and memory buffer can then be used to "shift" the pixelized column captured by the CCD line camera into the bit map. Subsequent columns of the image can be captured and stored by sequentially capturing a column of the image with the CCD camera, storing the column, and resetting the CCD camera.

An orthogonal coordinate system usually forms the basis for the bit map matrix. Thus, the bit map uniquely identifies the position of each pixel of the CCD array for each column captured. It is noted that a multiple line CCD camera or a two-dimensional array CCD camera may also be used to create bit map images. It is also noted that three-dimensional or higher-dimensional bit maps may similarly represent three-dimensional or higher-dimensional images in a computer memory, and that polar or other coordinate systems may similarly define positions within a bit map matrix. It is also noted that by storing values rather than bits, and/or by storing a series of bit maps for an image, an image including shading or color can be captured and stored in pixelized format.

In the continuous space, the coordinates of a rotated image are defined by the following standard rotation equations, where $\phi$ is the rotation angle, $\{x,y\}$ is the coordinate of an input pixel in the input plane, and $\{x', y'\}$ is the coordinate of that pixel as mapped to the output plane:

1. $x'=x\cdot\cos(\phi)+y\cdot\sin(\phi)$
2. $y'=x\cdot\sin(\phi)-y\cdot\cos(\phi)$ A straightforward way to rotate an image is to map each input pixel to an output pixel using the above rotation equations. Mapping input pixels into an output plane using the above rotation equations is known as forward pixel mapping.

Since the above rotation equations involve floating point operations (e.g., multiplication by a non-integer), the coordinates of output pixels are generally not integers. Floating point operations applied to a digital or pixelized image can cause rounding errors. Moreover, forward pixel mapping does not guarantee that each pixel in the output image will have a counterpart in the input image. A hole may be created in the output image at the location of an output pixel that has no corresponding input pixel mapped to it. Therefore, forward pixel mapping can cause "artifacts" such as holes to appear in the output image. For example, a continuous line of black pixels, such as a stroke in a text image, may appear to have missing pixels or holes after rotation. Artifacts can be corrected to some extent through post rotation filtering. However, post rotation correction can be computationally expensive and may produce unsatisfactory results.

Reverse pixel mapping is a method for rotating pixelized images without creating artifacts. Reverse pixel mapping involves scanning through the output image, and finding a unique pixel in the input image to map to each pixel in the output image. As a result, an image rotated using reverse pixel mapping does not include artifacts, because every pixel in the output image corresponds to a pixel in the input image.

Reverse pixel mapping techniques suffer from certain disadvantages. For example, for pixelized images in which the pixels are laid out in an orthogonal grid, reverse pixel mapping can distort the size and/or aspect ratio of the rotated image. In addition, reverse pixel mapping is computation-intensive because it requires that all of the pixels in the output image, foreground and background, be mapped from the input image.

Pixelized bit map matrix representations of images are memory intensive because a bit or value must be used to represent every pixel. Many images, especially black and white text images, include large regions of similar pixels. For example, a text image generally includes a relatively small foreground image containing the text against a uniform background. Therefore, it is advantageous to process only the foreground pixels of such images.

It is conventional and memory efficient to compress a pixelized image in "run-length encoded" format. Run-length encoding a pixelized image may be accomplished by expressing each row of the image in terms of one or more runs. A run is a series of similar adjacent pixels. A run can be represented in a run-length encoded table by elements indicating either the starting and ending points or the starting points and a run lengths; the intermediate points of a run need not be explicitly represented in the table. For a text image, all of the information in the image is usually included in the foreground image. Thus, only the foreground pixels of a text image need to be represented in the run-length encoded table.

A pixelized text image including lines of pixels may be compressed and stored in a run-length encoded table that includes rows of elements, wherein each row of the table corresponds to a line of the image. Only the lines of the image that include one or more foreground pixels need to be represented by a row in the table. The elements of each row of the table define one or more runs within the corresponding line, usually by identifying the starting and ending pixels of the run. In this manner, a significant memory savings may be realized by storing a pixelized text image in run-length encoded format.

Moreover, a pixelized image of an object moving past a CCD line camera, as may be the case in an OCR system, can be translated into run-length encoded format for storage in the computer memory without having to create or store a full bit map representation of the image. This is possible because the OCR system creates the pixelized image one column at a time, moving from one edge of the image to the other. This "sweeping" of the image, which may be thought of as going from left to right across the image, allows a run-length encoded image including runs that go from left to right to be created as the columns of the image are shifted out of the memory buffer. Thus, the image is converted into run-length encoded format for storage in the computer memory as the image is captured by the CCD line camera.

It is noted that for convenience, images are described herein as being created and/or encoded "from left to right", and reference is made to the "left edge" of the input and/or output planes. However, it will be appreciated that any direction across an image or edge could be equivalently used by the inventive method.

With the above described system, images captured in the OCR system are initially stored in run-length encoded format. Recall that an image captured in an OCR system typically must be rotated before the image is sent to the text reader. Therefore, there is a need to rotate a run-length encoded image. It would be advantageous to rotate a run-length encoded input image into a run-length encoded output image without having to expand the image into a full pixelized representation. It would also be advantageous to rotate a run-length encoded input image without creating artifacts in the output image. It would also be advantageous to avoid distortion, i.e., to produce a rotated output image with the correct aspect ratio.

Cahill, III et al., U.S. Pat. No. 4,792,891, describes a method that translates a run-length encoded image into a run-length encoded representation of a rotated version of the image. The method described involves "(1) establishing each scan line of the input image as a series of 'visible' and 'invisible' vectors by comparing run-lengths in a current scan line with run-lengths for a previous scan line, (2) determining color transition information for a manipulated or transformed output image by means of transform coefficients and storing this transition information in memory bins to characterize each of the output scan lines, and (3) sorting the bins from one end of the output scan to the other and constructing a new run-length encoded image from the sorted run-length encoded information." Cahill, III et al. at column 1, lines 51–61. Visible vectors define the edges of the foreground of the input image, while invisible vectors define the non-edge foreground pixels. See, Cahill, III et al. at column 2, lines 43–46.

The visible vectors, those defining the foreground edge pixels of the input image, are manipulated by steps such as multiplication by coefficients which serve to size, slant, rotate, or otherwise transform the various vectors to achieve a different set of X and Y coordinates in the plane of the output pixel grid. Cahill, III et al. at column 4, lines 3–7. Once the "visible" vectors have been translated, which is equivalent to mapping the foreground edge pixels of the input image into the output plane, sorting the elements of the rows of the output image allows the output image to be encoded in run-length format. Thus, Cahill, III et al. describes a method for rotating a run-length encoded image in which only the foreground pixels of the input image need to be processed.

The method described by Cahill, III et al. suffers from a number of drawbacks. First, it relies on floating point operations (i.e., multiplication by coefficients) to map data (i.e., visible vectors). As discussed previously, floating point operations can be computationally expensive and can cause artifacts to be created in the output image. The system may also map foreground pixels from an orthogonal input plane into an orthogonal output plane without regard to reduction or expansion of runs of pixels. Therefore, the system may distort the output image, i.e., it may not produce an output image with the correct aspect ratio. The system also requires one or more steps to create "visible" and "invisible" vectors, and a sorting step after foreground edge pixels have been mapped, to allow the output image to be encoded in run-length format.

Hideaki, U.S. Pat. No. 4,985,848, describes a method for rotating a pixelized image using a look-up table. Values are computed in advance and stored in a lookup table for cos(x), 2•cos(x) . . . max•cos(x); and for sin(x), 2•sin(x) . . . max•sin(x), for each angle (x) for which a rotation may subsequently be performed. Thus, subsequent pixel-to-pixel mappings may be performed using only simple addition and reduction operations and without any multiplication. Hideaki also describes a method for correcting for artifacts in the output image. Generally described, the method corrects for artifacts in the output image by (1) transforming a line of pixels a first time, (2) identifying pixels within the line that are shifted by a small adjustment in the angle of rotation, and (3) transforming the line a second time from a temporary reference point that is slightly offset from the reference point used for the first transformation. Hideaki also describes an interpolation method whereby an output pixel location is determined by mapping and interpolating four points.

The method described by Hideaki suffers from a number of disadvantages. First, the method does not provide for rotating a run-length encoded image. Second, although the method avoids computationally expensive fixed point multiplication steps by using a look-up table, mapping pixels using the look-up table still produces artifacts in the output image. Third, the method relies on computationally expensive post rotation computations to correct for artifacts in the output image such as twice mapping pixels and interpolating.

Baldwin et al., U.S. Pat. No. 4,827,413, describes a method for displaying a two dimensional image of a three dimensional object. Baldwin et al. describes rotating a two dimensional image by first ran-length encoding the image, and then transforming the encoded image into a different rotational aspect. Transformation is accomplished by multiplying the vectors representing runs comprising the input image by transformation matrices. To avoid the creation of artifacts in the output image, a vector is plotted twice, with the second vector having a start address at a small offset from the first vector. Edge pixels are first transformed into the output plane so that only foreground pixels need be mapped.

Baldwin et al. suffers from a number of significant drawback because it relies on floating point operations to rotate vectors, and because it is a computationally expensive method of twice plotting vectors to avoid the creation of artifacts in the output image. In addition, Baldwin et al. does not describe a method for directly creating an output image in run-length encoded format.

Therefore, there remains after Cahill, III et al., Hideaki, and Baldwin et al. a need for a more computationally efficient method for rotating a run-length encoded image. In addition, there remains a need for a method for rotating a run-length encoded input image to produce a run-length encoded output image without creating artifacts in the output image, without relying on fixed point operations, without having to create a full pixelized representation of the input or output image, and whereby an output image is produced with the correct aspect ratio.

Thus, there is a great need for an improved method and system for rotating a run-length encoded image that can be used in conjunction with over-the-belt or other OCR readers. In particular, there is a great need for a rotation system that can quickly process a sufficiently large number of images so that the system can be used as an integral pan of an automatic parcel handling system used in the parcel delivery industry.

It would be advantageous for such a system to embody a number of important advantages including: (1) the use of low cost components such as a monochrome CCD line camera and a general purpose computer; (2) the ability to rotate an image without relying on floating point operations; (3) the ability to rotate an image by processing only the foreground pixels; (4) the ability to avoid the creation of artifacts in the output image; (5) the ability to rotate a run-length encoded input image to obtain a run-length encoded output image without having to create or store a full pixelized representation of the input or output images; (6) the ability to rotate a run-length encoded input image to obtain a run-length encoded output image with the correct aspect ratio; and (7) the ability to create a run-length encoded output image without having to sort pixels after they have been mapped to the output image.

SUMMARY OF THE INVENTION

I. Introduction

The present invention meets the above objectives by providing a system and method for rotating run-length encoded images. The inventive method uses a reverse pixel mapping technique to map output runs from an input image so as to avoid the creation of holes or artifacts in the output image. The inventive method scales mapped output runs to preserve the aspect ratio of the rotated image, and selects the order in which to process the elements of the input run-length input table so as to directly create a run-length encoded output table.

The inventive method includes a high speed computer algorithm for rotating images stored in a computer memory, such as those captured by a CCD array. The algorithm translates a run-length encoded input image into a run-length encoded output image that is a rotated version of the input image. The primary advantages of the invention are increased speed, increased accuracy, and reduced memory requirements as compared to prior art rotation methods.

Generally described, the present invention is a method and system for obtaining output image data representing an output image from input image data representing an input image, wherein the output image and the input image each represent lines of pixels, wherein the output image is a rotated version of the input image, and wherein the input image data includes rows of elements. The inventive method steps include selecting a quadrant of rotation; selecting a rotation angle from a pre-defined set of rotation angles; in response to the rotation angle, retrieving a predefined pixel mapping sequence for mapping pixels of the input image to pixels of the output image; in response to the quadrant of rotation, selecting a row order in which to read the rows of the input image data and an element order in which to read the elements of each row of the input image data; and mapping the input image data to the output image data in row order, and within each row in element order, in accordance with the pixel mapping sequence.

It is noted that the present invention is not restricted to use with run-length encoded images. More specifically, the elements within the rows of the input image data may correspond to pixels of the input image, or may define foreground runs of the input image, or may otherwise represent the input image. Similarly, the output image data may correspond to pixels of the output image, or may define foreground runs of the output image, or may otherwise represent the output image. For example, the present invention may be used to map pixelized input data to pixelized output data, as might be required for real time rotation of screen images. Similarly, the present invention may be used to map a run-length encoded input image to a pixelized output image, or to map a pixelized input image to a run-length encoded output image.

The preferred embodiment of the present invention provides a method and system for obtaining a run-length encoded output image defined by one or more output runs from a run-length encoded input image defined by one or more input runs, wherein the run-length encoded output image represents an output image comprising lines of pixels, wherein the run-length encoded input image represents an input image comprising lines of pixels, and wherein the output image is a rotated version of the input image. The run-length encoded input image includes rows of elements wherein each row corresponds to a line of the input image, and the run-length encoded output image includes rows of elements wherein each row corresponds to a line of the output image.

According to one aspect of the preferred embodiment, a run-length encoded input image is processed in response to the quadrant of rotation in a row order, and within each row in an element order. The processing step includes determining the location in the input image of the pixels of an input run, and mapping the pixels of the input run to the output image in accordance with the pixel mapping sequence. Determining the location in the output image of the pixels of the input runs includes, in response to the rotation angle, determining one or more predefined pixel locations in the output image corresponding to an edge of the input image; and determining the location of an input image pixel in the output plane in relation to the location of one or more edge pixel in the output plane.

According to another aspect of the present invention, the step of determining the location of an input image pixel in the output plane comprises reverse pixel mapping to avoid the creation of holes or artifacts in the output image.

According to another aspect of the preferred embodiment, a run-length output image is constructed. The inventive steps include, after processing the elements defining each input run and prior to processing the elements defining a subsequent input run, augmenting a run-length encoded output image so as to incrementally construct the run-length encoded output image. The step of augmenting the run-length encoded output image includes referring to the input image to determine whether each pixel mapped to the output image is located adjacent to a previously mapped pixel in the same line of the output image, and if a mapped pixel is located adjacent to a previously mapped pixel in the same line of the output image, adding the mapped pixel to an output run comprising the previously mapped pixel; and, if a mapped pixel is not located adjacent to a previously mapped pixel in the same line of the output image, defining a new output run starting with the mapped pixel.

According to another aspect of the preferred embodiment, the output runs are scaled to restore the aspect ratio of the rotated image. The inventive steps include, in response to the rotation angle, retrieving a predefined scaling factor, and scaling the output runs by the scaling factor. Preferably, for a rotation angle $\phi$, the scaling factor is equal to $1/\cos^2(\phi)$.

The preferred embodiment is specifically developed for use as an integral part of an over-the-belt OCR reader system for scanning parcels. The rotation system uses low cost components including a monochrome line-scan type CCD camera, a standard video controller, a standard eight-bit A/D converter, and a general purpose computer including a first-in-first-out (FIFO) buffer and a general purpose memory. The OCR system scans a parcel as it moves along an adjacent conveyor, determines the position and orientation of the address affixed to the parcel, rotates the address using the inventive method, and then passes the rotated image to a text reader.

While the preferred embodiment of the present invention is disclosed in the context of an OCR reader, those skilled in the art will appreciate that the principles of the present invention may be applied to virtually any type of rotation system for pixelized images.

Therefore, it is an object of the present invention to provide a rotation system for pixelized images that is usable with an OCR reader system.

It is a further object of the present invention to provide a rotation system for pixelized images that is highly accurate yet computation and memory efficient.

It is a further object of the present invention to provide a low cost rotation system for pixelized images.

It is a further object of the present invention to provide a rotation system for pixelized images that uses a general purpose microcomputer.

It is a further object of the present invention to provide a rotation system for pixelized images that uses low cost components such as a monochrome CCD line camera and a general purpose computer.

It is a further object of the present invention to provide a rotation system for pixelized images with the ability to rotate an image without relying on floating point operations.

It is a further object of the present invention to provide a rotation system for pixelized images with the ability to rotate an image by processing only the foreground pixels.

It is a further object of the present invention to provide a rotation system for pixelized images with the ability to avoid the creation of artifacts in the output image.

It is a further object of the present invention to provide a rotation system for pixelized images with the ability to rotate a run-length encoded input image to obtain a run-length encoded output image without having to create or store a full pixelized representation of the input or output images.

It is a further object of the present invention to provide a rotation system for pixelized images with the ability to obtain an output image with the correct aspect ratio.

It is a further object of the present invention to provide a rotation system for pixelized images with the ability to create a run-length encoded output image without having to sort pixels after they have been mapped to the output image.

That the present invention and the preferred embodiments thereof improve over the drawbacks of the prior art and accomplish the objects of the invention set forth above will become apparent from the following detailed description of the preferred embodiments. Further objects and advantages of the present invention may become apparent from a review of the following detailed description of the preferred embodiments and the appended claims and drawings.

BRIEF DESCRIPTION OF THE DRAWINGS

FIG. 1 is a diagram of an Optical Character Recognition (OCR) system that provides the environment for the preferred embodiment of the present invention.

FIG. 9, consisting of FIGS. 9A–9B, illustrates the mapping of input plane edge pixels to an output plane for an angle of rotation of 26.3 degrees.

DESCRIPTION OF THE PREFERRED EMBODIMENTS

Figure 2A:
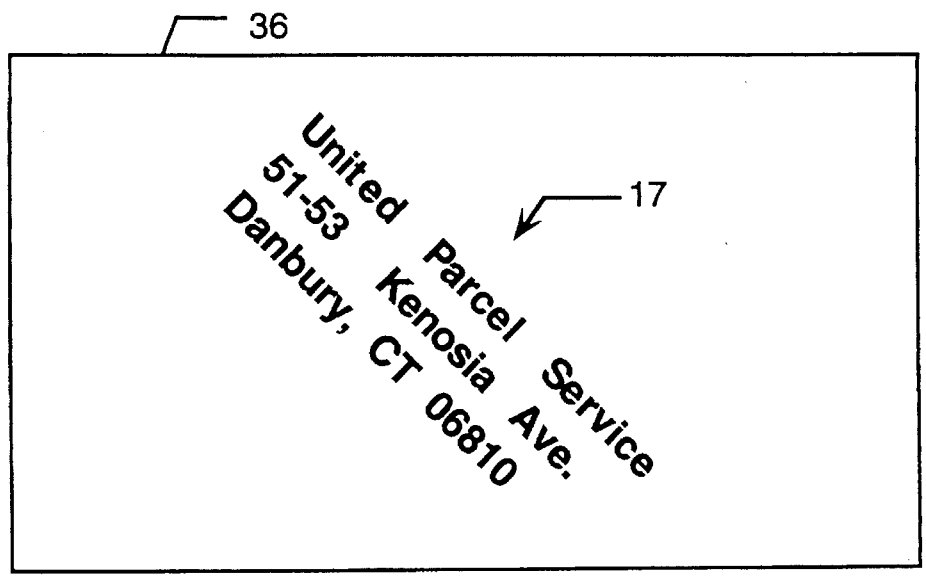
FIG. 2, consisting of FIGS. 2A–2B, is a diagram illustrating the rotation of a text image.

Referring now to the drawings, in which like numerals refer to like elements in the several views, FIG. 1 shows an over-the-belt optical character recognition (OCR) reader system 10 including a preferred embodiment of the present invention. The OCR system includes conveyer 12 on which parcel 14 is being carded. Parcel 14 bears address block 16, in which text 17 indicating the destination address is written (represented by the word "Text" in FIG. 1, but shown as an address in FIG. 2). Light source 18 in conjunction with reflector 20 illuminates parcel 14 as it is conveyed through the viewing area of CCD camera 22, which captures an image of the surface of parcel 14 including address block 16.

CCD camera 22 is preferably a monochrome, 4,096 pixel line-scan type camera such as one using a Kodak KLI-5001 CCD chip. Camera 22 is mounted to have an optical path of 98 inches to conveyor 12, with a 16 inch field of view at the conveyor. Conveyer 12 may carry approximately 3,600 parcels per hour, and may move at a rate of 100 feet per minute. CCD camera 22 is positioned approximately 25 inches above the center of conveyer 12 and may be pointed towards a first mirror (not shown), which may be pointed towards a second mirror (not shown), which may be pointed at conveyor 12, such that the optical path from CCD camera 22 to conveyor 12 is 98 inches. These parameters may be varied somewhat without unduly affecting the performance of the present invention. Those skilled in the art will appreciate that mirror systems can be used to increase the optical path length of a camera system while accommodating a smaller physical distance between the camera and the object to be imaged. See, for example, Smith et at., U.S. Pat. No. 5,308,960, which is hereby incorporated by reference. See also the commonly owned pending U.S. patent application Ser. No. 08/292,400, "Optical Path Equalizer" filed Aug. 18, 1994, inventors Johannes A. S. Bjorner and Steven L. Smith, incorporated herein by reference.

Controller/converter 24 includes a standard video controller that controls the scan rate of CCD camera 22. Controller/converter 24 also creates and transfers to computer 26 a pixelized image as captured by CCD camera 22. Computer 26, which may be a low cost general purpose computer, then uses computer program 30 to rotate the image, and passes the rotated image on to the text reader 32. The inventive method steps of the present invention, which are described with more particularity below, are carried out by computer 26 under control of program 30.

Controller/converter 24 includes a standard eight-bit A/D converter. CCD camera 22 transmits a series of analog image to controller/converter 24, which converts the analog signals into an eight-bit digital gray scale representation of the image, which is then transmitted to computer 26, where it is stored as a pixel map. The gray scale pixel map is then thresholded to produce a binary bit map representation of the image. Belt encoder 34 provides a signal indicating the speed of conveyor 12 to controller/converter 24. A bit map with a correct aspect ratio (i.e., the ratio of the length of the image to the width) is stored in the memory of computer 26 by synchronizing the speed of the CCD camera 22 scan rate with the speed of the OCR conveyor 12.

Figure 2B:
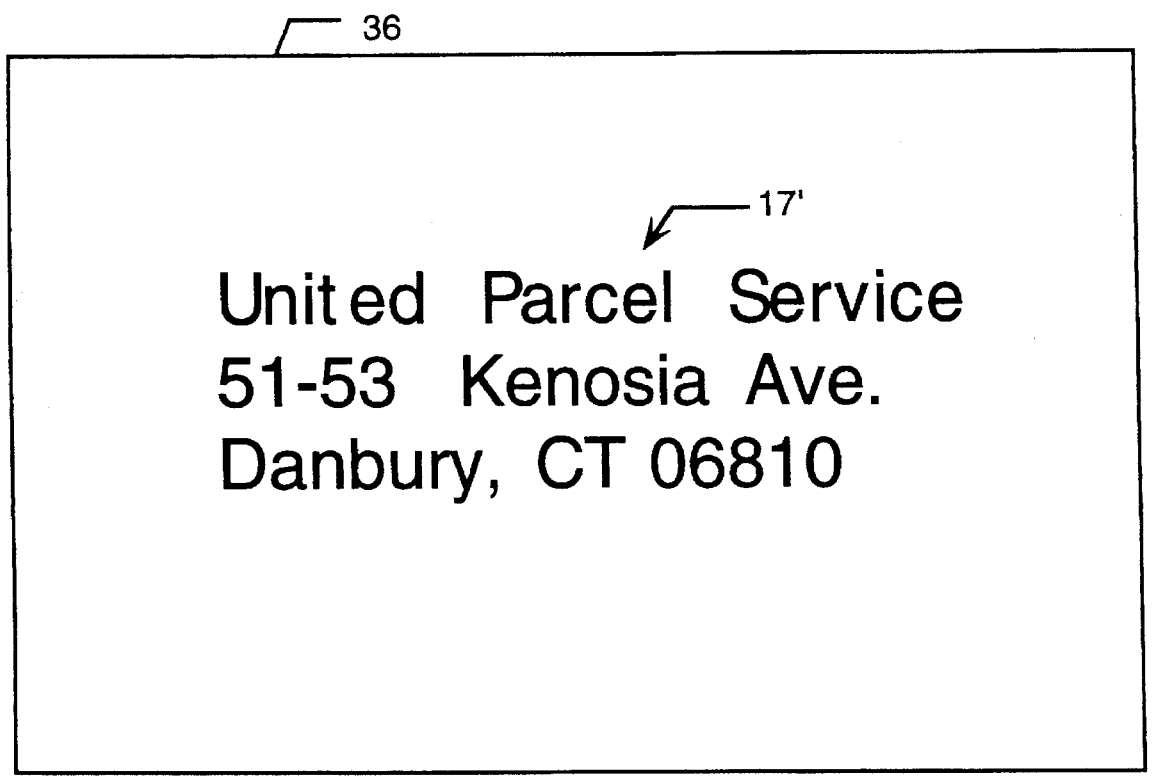

As shown in FIG. 2A, the text 17 may be oriented at an angle with respect to the OCR reader coordinate system 36 as shown in FIG. 2A. Once the location and orientation of the text 17 has been ascertained, it is rotated in computer 26 in accordance with computer program 30 so that the text 17' is oriented properly for the text reader 32, as shown in FIG. 2B. The text reader may then further process the image of the text, preferably by reading and recognizing the text. In creating the rotated text image 17', computer program 30 increases the size and preserves the aspect ratio of the original text image 17. Computer program 30 also avoids the creation of artifacts in the rotated text image 17'.

Figure 3:
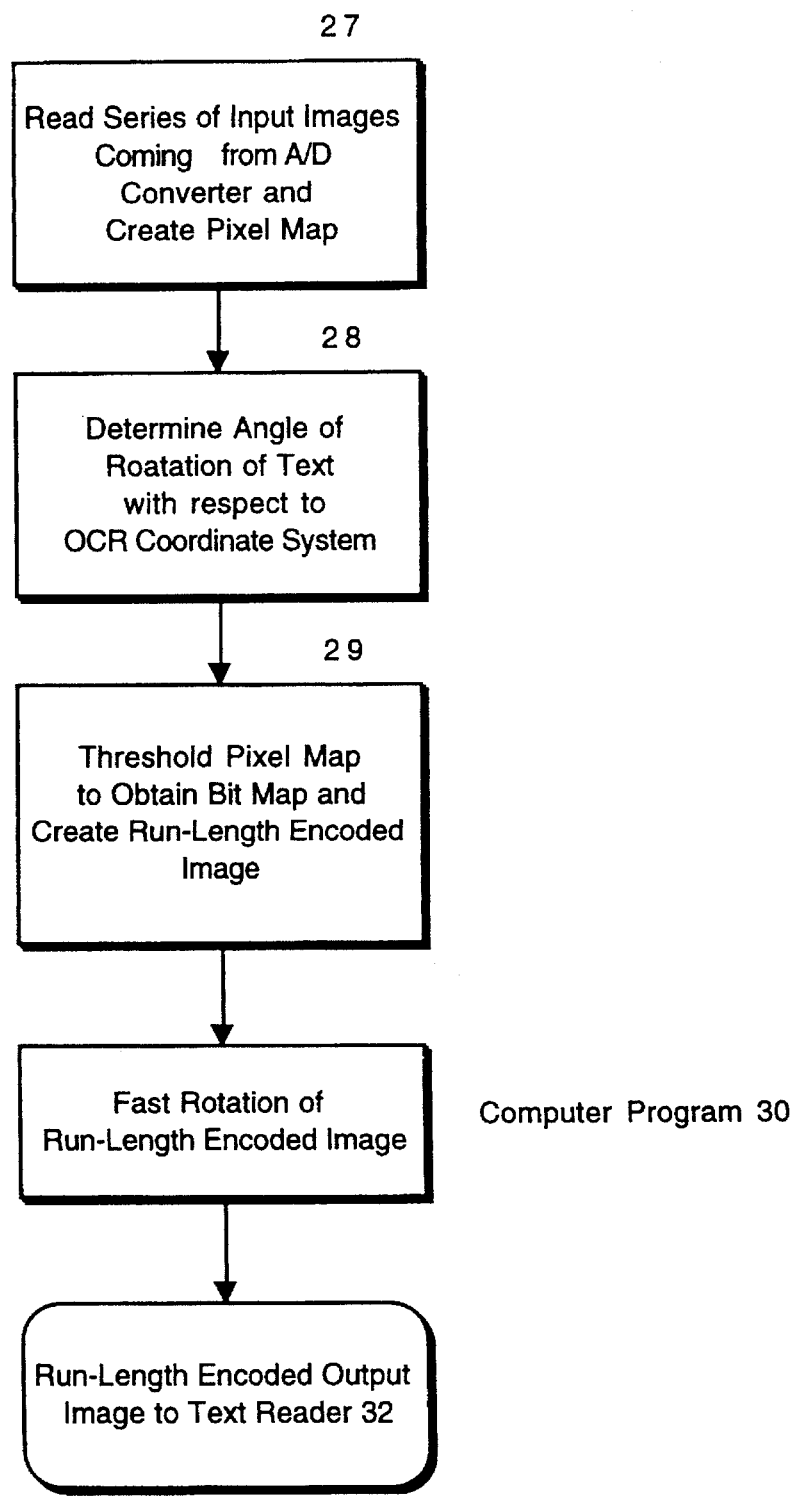
FIG. 3 is a logical flow diagram illustrating image processing conducted by the OCR system.

FIG. 3 is a logical flow diagram of the image processing performed by OCR system 10. As shown in FIG. 3, computer program 30 is implemented in an intermediate stage of OCR system 10. Before computer program 30 is implemented, a series of line images coming from converter/controller 24 are read and assembled into a pixel map in step 27. Those skilled in the art will appreciate that a converter/controller 24 comprising an A/D converter and a video processor controlling a line scan-CCD camera 22, a FIFO buffer, and a general purpose memory can be used to produce and control the aspect ratio of a two-dimensional computer image of an object 14 moving past the camera along a conveyor belt when provided with a signal from a belt encoder 34 indicating the speed of the conveyor belt. See, for example, Shah et at., U.S. Pat. No. 5,291,564, which is incorporated by reference.

The angle of rotation of the text 17 with respect to the OCR system coordinate system 36 is determined in step 28. The preferred method and system for step 28 is described in the commonly owned pending U.S. patent application Ser. No. 08/419,176, "Method for Locating the Position and Orientation of a Fiduciary Mark" filed Apr. 10, 1995, inventors James Stephen Morton and James Vincent Recktenwalt, which is incorporated by reference. As described therein, a second CCD camera system (not shown) may be used to perform step 28. It is noted that belt encoder 34 may provide a signal indicating the speed of conveyor 12 to the second CCD camera system. The two CCD camera systems may thereby be synchronized in the operation of OCR system 10. In this manner, the system comprising camera 22 may be used to read and rotate text 17 within a predetermined area of interest on the surface of parcel 14, the area of interest and the rotation angle having been previously determined by the second CCD camera system.

In step 29, the pixel map is thresholded to produce a bit map representation of the image which is encoded and stored in run-length encoded format. The preferred method and system for producing a bit map representation of an image from an eight-bit gray scale pixel map is described in the commonly owned pending U.S. patent application Ser. No. 08/380,732, "Method and Apparatus for Separating Foreground From Background in Images Containing Text" filed Jan. 31, 1995, inventors Michael C. Moed and Izrail S. Gorian, which is incorporated by reference.

Computer program 30 then rotates the run-length encoded input image, creating a run-length encoded output image which is sent to the text reader 32. Those skilled in the an will appreciate that many different combinations of hardware will be suitable for practicing the present invention. Many commercially available substitutes, each having somewhat different cost and performance characteristics, exist for each of the physical components listed above. For example, computer 26 could be hardwired logic, reconfigurable hardware, an application specific integrated circuit (ASIC), or some other equivalent means for implementing a set of instructions.

Figure 4A:
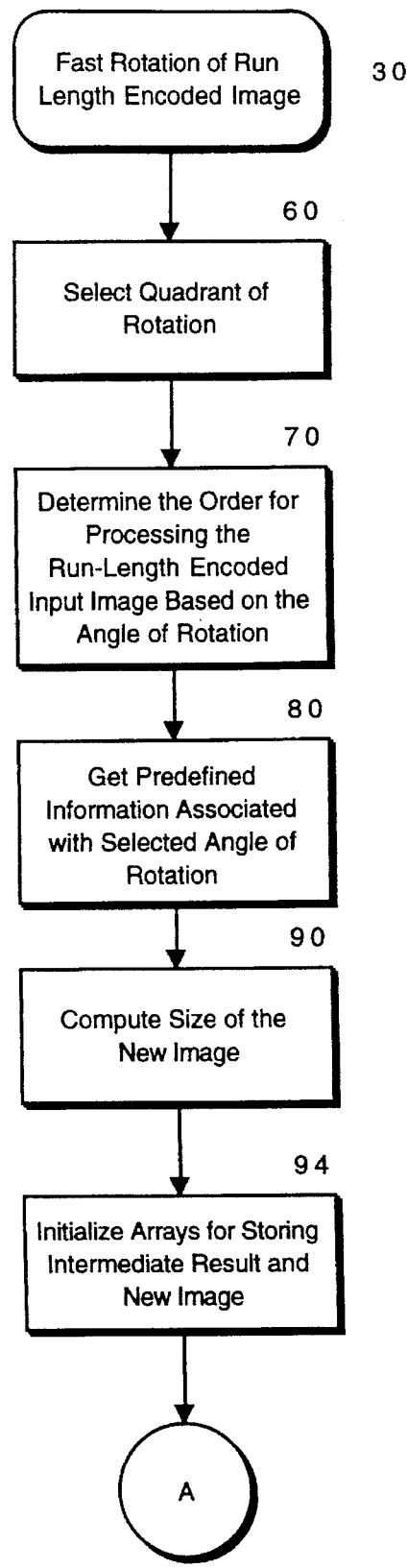
FIG. 4, consisting of FIGS. 4A–4C, is a logical flow diagram illustrating the preferred method for practicing the present invention.
Figure 4B:
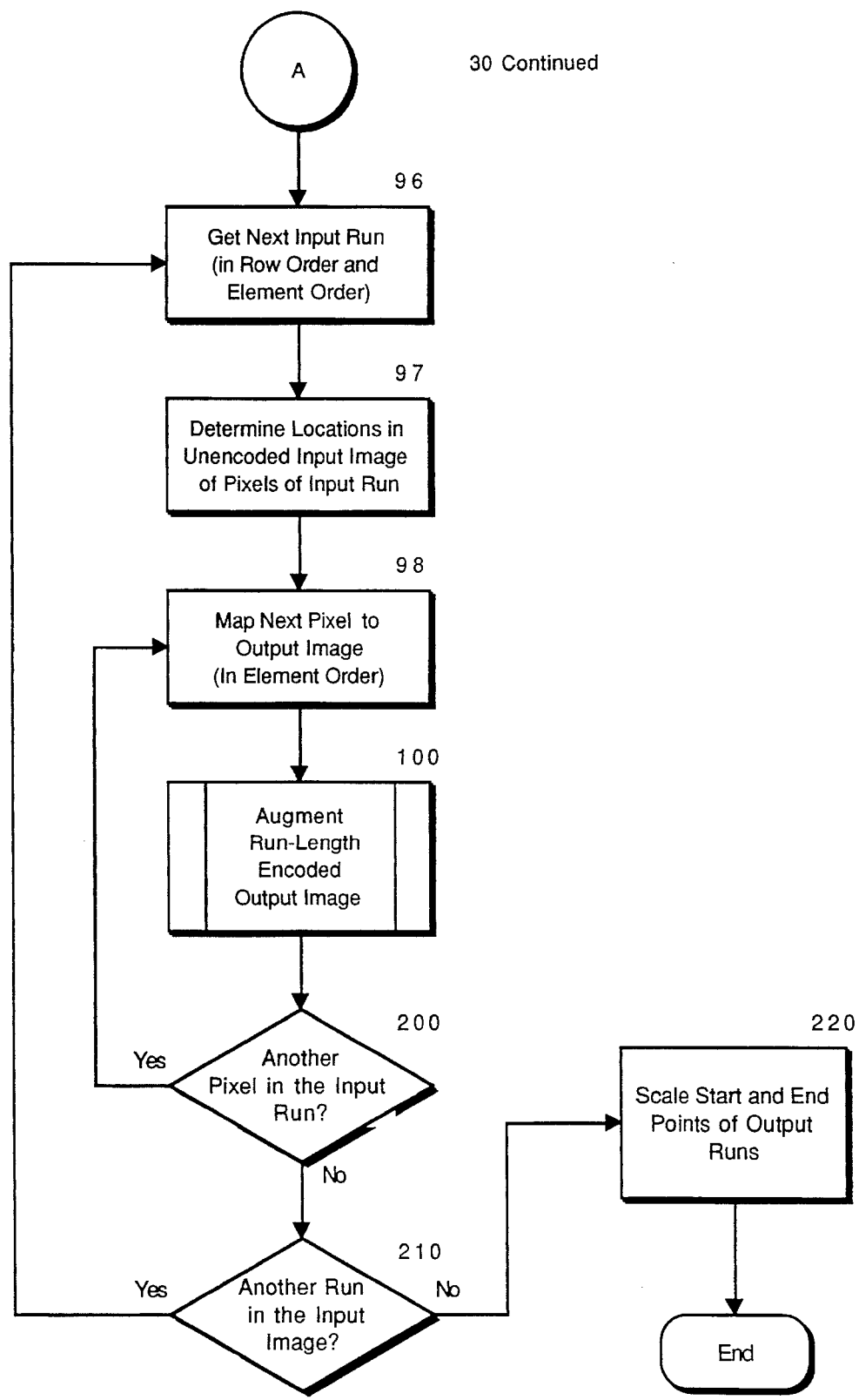
Figure 4C:
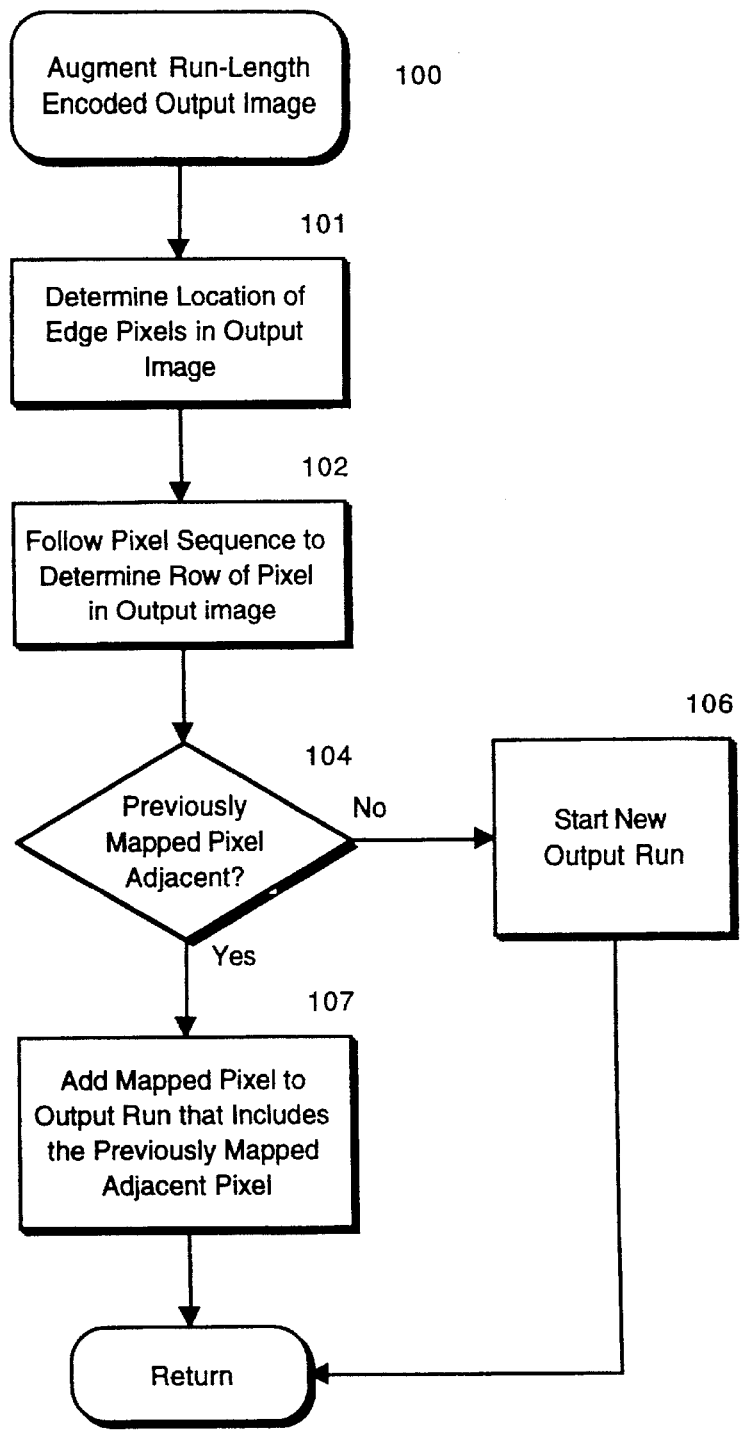

FIG. 4, comprising FIGS. 4A, 4B and 4C, shows a logical flow diagram for computer program 30, a method for producing a run-length encoded output image from a run-length encoded input image, in which the output image is a rotated version of the input image.

Figure 5A:
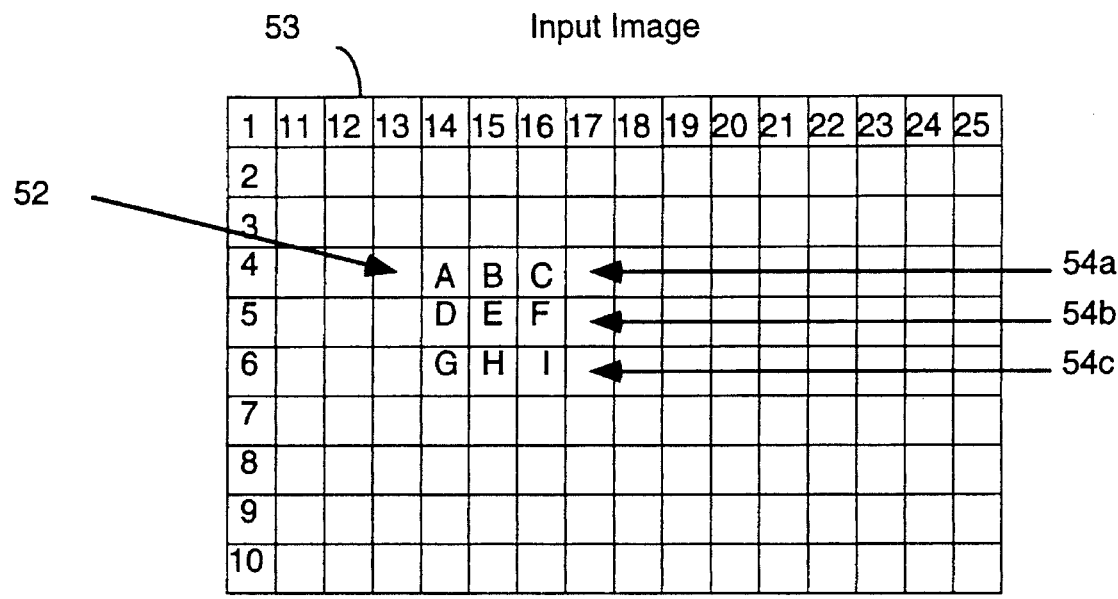
FIG. 5, consisting of FIGS. 5A–5B, illustrates a pixelized image and a run-length encoded table corresponding to the image.
Figure 5B:
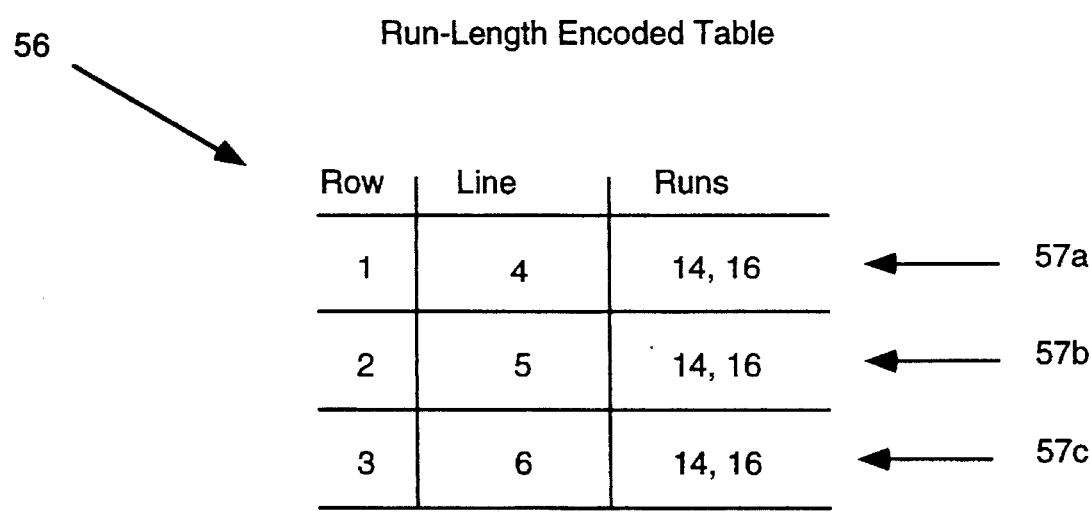

FIG. 5, comprising FIGS. 5A and 5B, shows a simple input image that will be rotated to illustrate the operation of computer program 30. FIG. 5A shows a pixel image 52, a 3 pixel by 3 pixel square, within an input image plane 53. Pixel image 52 comprises three lines of foreground pixels 54a, 54b, and 54c. The pixels in line 54a are labeled A, B and C; the pixels in line 54b are labeled D, E and F; and the pixels in line 54c are labeled G, H and I. It will be appreciated that pixels A to C, D to F, and G to I form three runs comprising the input image 52. The edge pixels of the input image plane 53 are numbered 1 through 25, with 1 through 10 being pixels along the left edge of the plane 53, and the pixels numbered 11 through 25 being pixels along the top edge. Thus, pixels 1 through 10 designate lines of the input image plane, whereas pixels 11 through 25 designate columns.

FIG. 5B shows a run-length encoded table 56 corresponding to the input image 52. The run-length encoded table includes rows of elements, 57a, 57b, and 57c. Each row corresponds to a line of pixels, and the elements within each row define one or more runs of pixels in the unencoded image. For example, row 1 of table 56 has elements "5" under the heading "line" and the elements "14, 16" under the heading "runs". The elements under the heading "runs" designate the starting and ending points of a run in the corresponding line. Thus, row 1 of table 56 defines the run "A to C" in line 54a of input image 52, which has pixels in columns 14 to 16 of line 5. Rows 2 and 3 of table 56 similarly define the runs "D to F" and "G to I" of input image 52, respectively.

Figure 6:
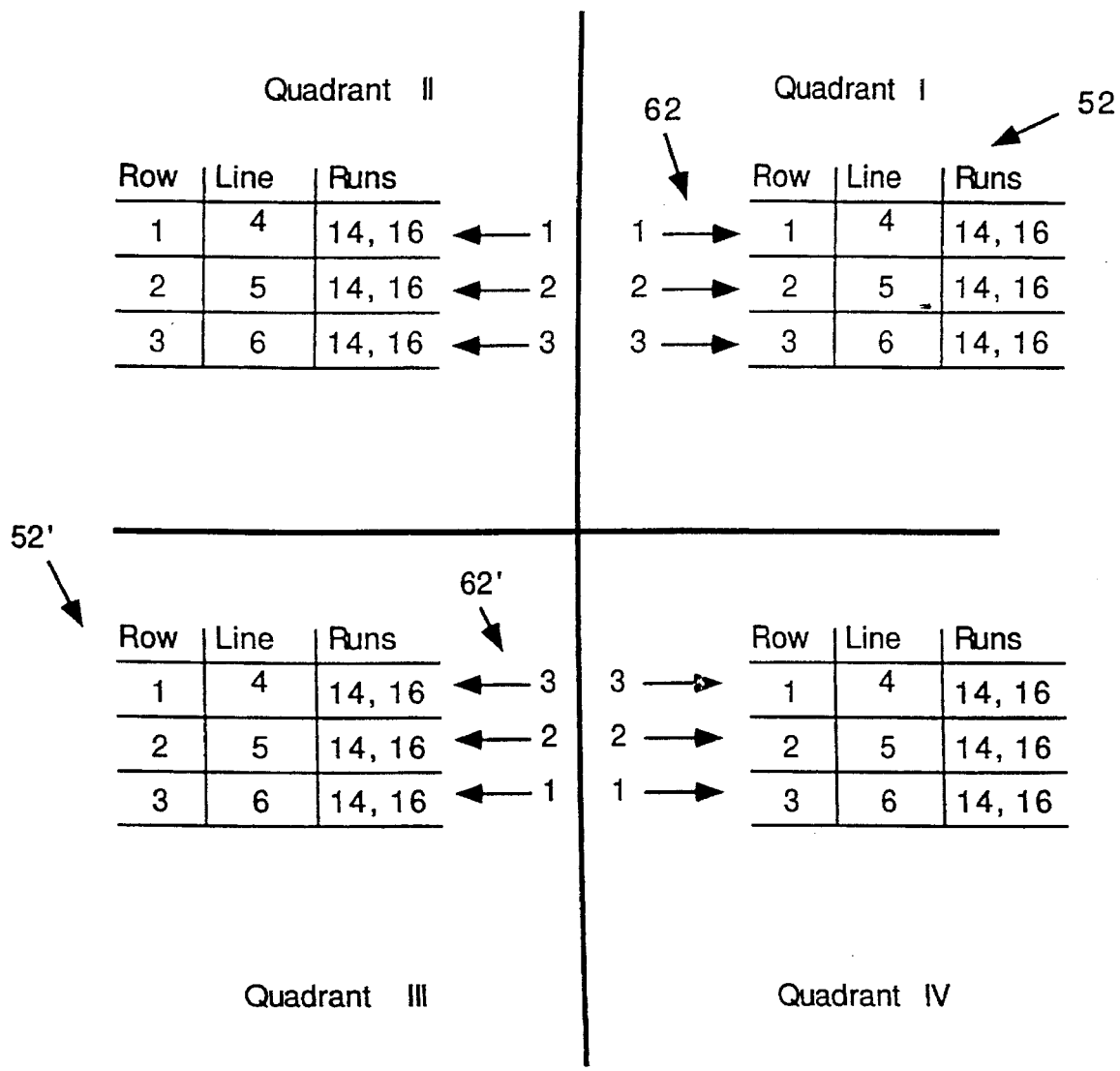
FIG. 6 illustrates a method for determining the order in which to read a ran-length encoded table in response to a quadrant of rotation.

Referring now to FIGS. 2, 4A and 6, program 30 first identifies a quadrant of rotation in step 60. The quadrant of rotation corresponds to angle of text 17 with respect to the OCR coordinate system 36. Angles between zero and 90 degrees are in quadrant I; angles between 90 and 180 degrees are in quadrant II; angles between 180 and 270 degrees are in quadrant III; angles between 270 and 360 degrees are in quadrant IV. For example, referring to FIG. 2A, the angle of text 17 is in quadrant IV with respect to OCR coordinate system 36.

Based on the quadrant of rotation, the order 62 for processing the rows, and elements within each row, of the run-length encoded input table 52 is selected, as shown in FIG. 6. For text in quadrant I, the rows are read from top to bottom and the runs within each row are read from left to fight; for text in quadrant II, the rows are read from top to bottom and the runs within each row are read from right to left; for text in quadrant III, the rows are read from bottom to top and the runs within each row are read from right to left; for text in quadrant IV, the rows are read from bottom to top and the runs within each row are read from left to right.

Order 62 defines both a row order for processing rows (as indicated by the sequence "1, 2, 3" preceding the arrows shown in FIG. 6) and an element order for processing elements within each row (as indicated by the direction of the arrows shown in FIG. 6). By so selecting the order for processing the run-length encoded input table, the inventive method ensures that creation of the output image will "sweep" across the output plane from left to right. For example, it will be appreciated that mapping the pixels of input image 52 in the order 62 shown in FIG. 6 for quadrant I will cause the image to be mapped, from left to fight, without rotation. Similarly, it will be appreciated that mapping the pixels of input image 52 in the order 62' shown in FIG. 6 for quadrant III will cause the image to be mapped from left to right with 180 degrees rotation. Mapping the lines of input pixels in the order 62' will thus cause a 180 degree rotated version of the input image to "sweep" from left to right across the output plane.

It will be appreciated that an image can be convened directly into run-length encoded format from a series of lines or columns provided that the series "sweeps across" the image. Moreover, as will be explained below, the reverse pixel mapping technique employed in computer program 30 requires the pixels be mapped so as to sweep from left to right across the output plane. Therefore, it will be appreciated that by properly selecting the order 62 for processing the pixels of the input image, it is possible to create a run-length encoded output image using reverse pixel mapping directly from the pixels of the input image as they are mapped, without having to create or store a full pixelized representation of the input or output images.

Referring now to FIGS. 4A and 7, in the next step 70 an angle of rotation is selected from a predefined set of rotation angles. Each angle in the predefined set of rotation angles has a rational tangent. The tangent of an angle can be thought of as its "rise" over its "run". Thus, plotting points of a line with angle $\phi$ in an orthogonal coordinate plane can be accomplished by starting at a point in the coordinate plane, and following the "rise" and "run" of the tangent of angle $\phi$ from point to point along the line.

An angle with a rational tangent has a tangent that can be expressed in a ratio of "rise" and "run" wherein the "rise" and the "run" are integers. Therefore, any line that can be plotted in a coordinate plane with a sequence that can be described as "up A—over B", where A and B are integers, has a rational tangent. Thus, mapping a line with angle zero in an input coordinate plane to a line in an output coordinate plane, wherein the line in the output plane is to be plotted at the angle that has a rational tangent equal to A divided by B, can be accomplished by finding a starting point in the output plane and then going "up A—over B" to plot the line in the output plane. It will be appreciated that more complex methods may be used to approximate a continuous space line in pixelized format.

It is noted that in a run-length encoded image, each run in the input plane (i.e., an input run) is a line segment at angle zero in the input coordinate plane. Thus, rotating an input run by mapping it from an input plane to an output plane as shown in FIG. 7 can be accomplished by finding a starting point for the run in the output plane, and then following a pixel mapping sequence in the output plane defined by the "rise" and "run" of the tangent of the rotation angle.

Step 70 uses a predefined set of rotation angles with rational tangents as rotation angles for rotating input images. For each rotation angle a pixel mapping sequence defined by the "rise" and "run" of the tangent is stored. The input runs are then mapped to the output image in accordance with the predefined pixel mapping sequence. It is noted that such a pixel mapping sequence defines relative relationships between pixels in a range space (e.g., an input plane) and corresponding pixels in a domain space (e.g., an output plane). It is also noted that "mapping a pixel" as used herein means "finding the location of a pixel in a domain space based on the location of a corresponding pixel in a range space". Importantly, "mapping a pixel" as used herein does not connote or require explicitly creating a pixelized image in either the range or the domain space. Indeed, the inventive method uses a "pixel mapping sequence" to create a run-length encoded output image that is a rotated version of a run-length encoded input image without creating or storing a full pixelized representation of the output or input image.

For example, FIG. 7 shows the mapping of a run 72 in the input plane 73 to the output plane 76 for several angles of rotation with rational tangents. FIG. 7A illustrates the pixel map 74 for rotating a run 72 of an input image grid 73 by an angle φ with a tangent equal to ½ (i.e., φ=26.3 degrees). FIG. 7A shows run 72 in the input image grid 73, whereas FIG. 7B shows the pixel map 74 for the rotated line in the output image grid 76. As shown in FIG. 7B, a line 78 at an angle φ can be plotted in the output plane by plotting points defined by the "rise" and the "run" of the tangent of φ. Specifically, line 78 may be constructed by plotting a point at the origin of grid 76, and then going "up one" and "over two", and plotting the next point; and then going "up one" and "over one", and plotting the next point, etc. As shown in FIG. 7B, the pixel map 74 follows angle φ in the output plane. FIG. 7B also shows the pixel mapping sequence 79 that corresponds to the mapping of the pixels of run 72 from left to right.

Figure 7A:
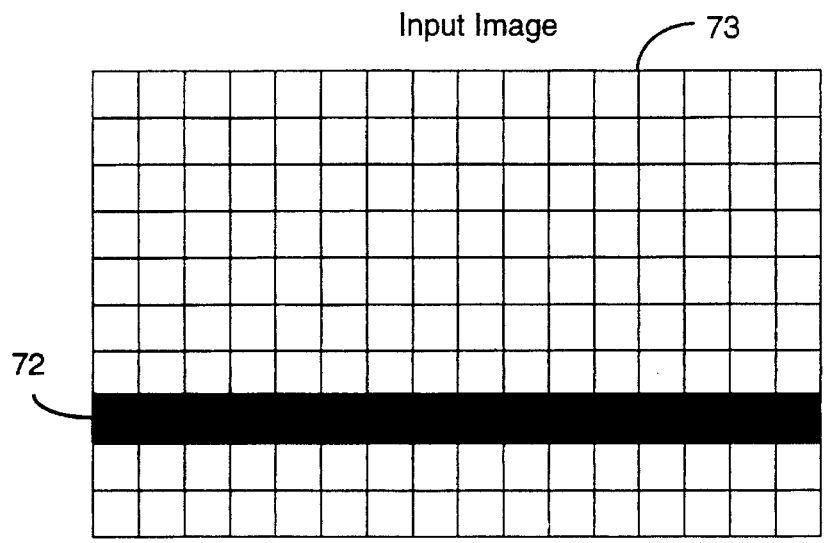
FIG. 7, consisting of FIGS. 7A–7E, illustrates the rotation of an input run by several angles with rational tangents.
Figure 7B:
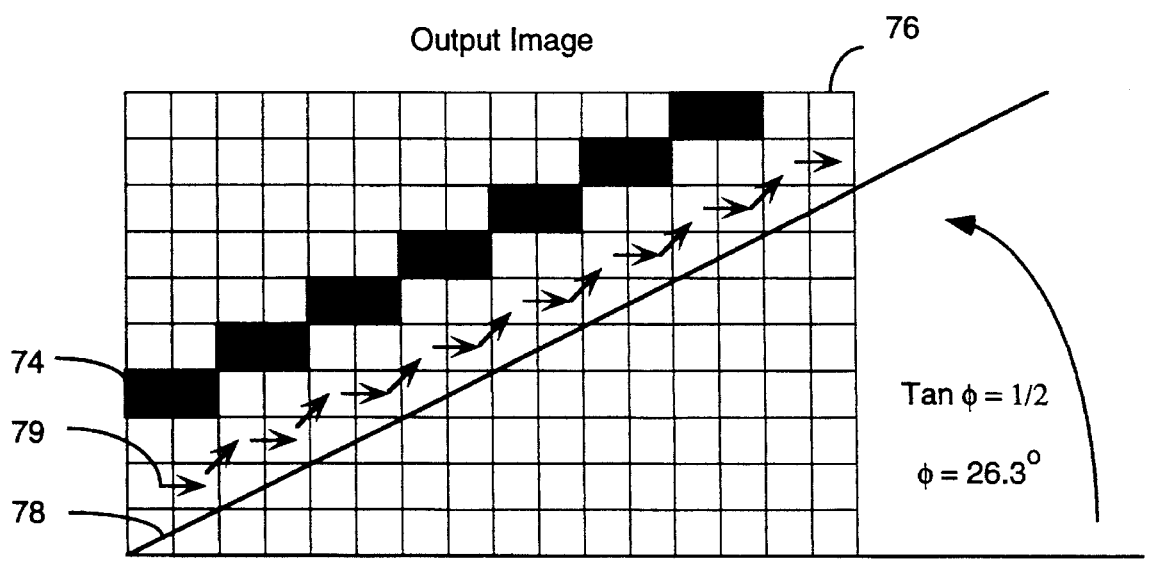
Figure 7C:
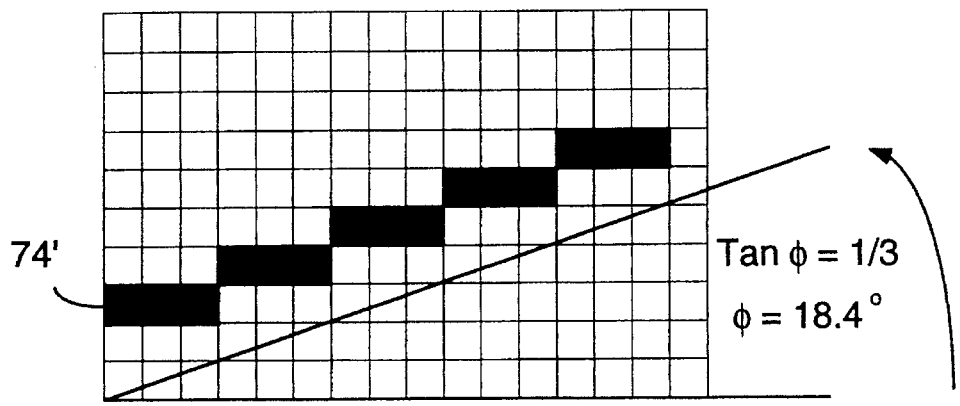
Figure 7D:
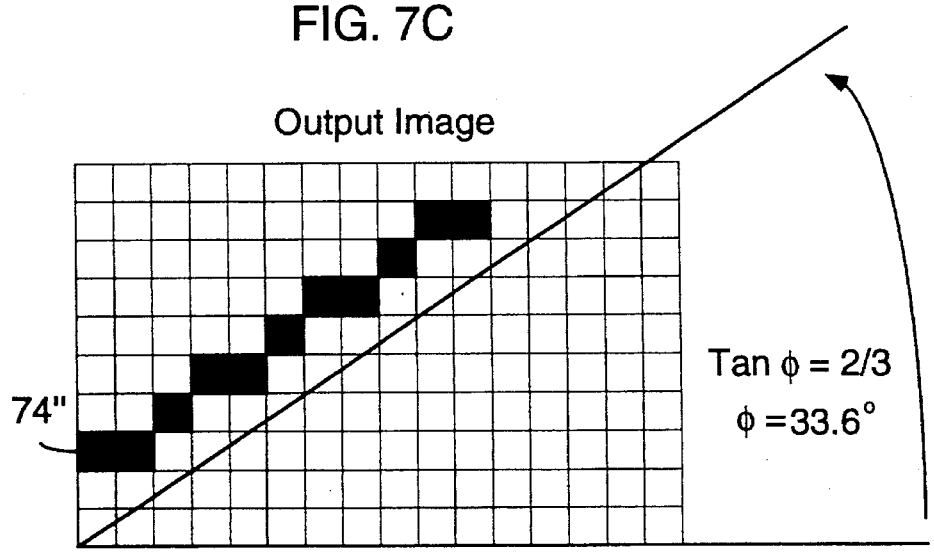
Figure 7E:
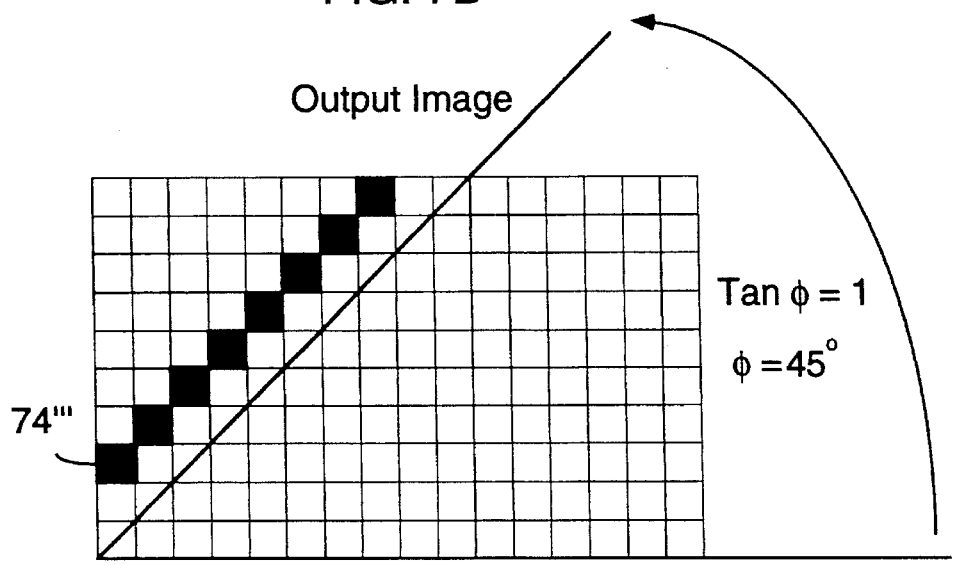

FIG. 7C illustrates the pixel map 74' for rotating run 72 by an angle φ with a tangent equal to ⅓ (i.e., φ=18.4 degrees). FIG. 7D illustrates the pixel map 74" for rotating run 72 by an angle φ with a tangent equal to ⅔ (i.e., φ=33.6 degrees). FIG. 7E illustrates the pixel map 74''' for rotating run 72 by an angle φ with a tangent equal to 1 (i.e., φ=45 degrees). It will be appreciated that for a much larger pixel plane (i.e., a pixel plane with greater resolution), additional pixel maps can be constructed for additional angles with rational tangents.

Figure 8A:
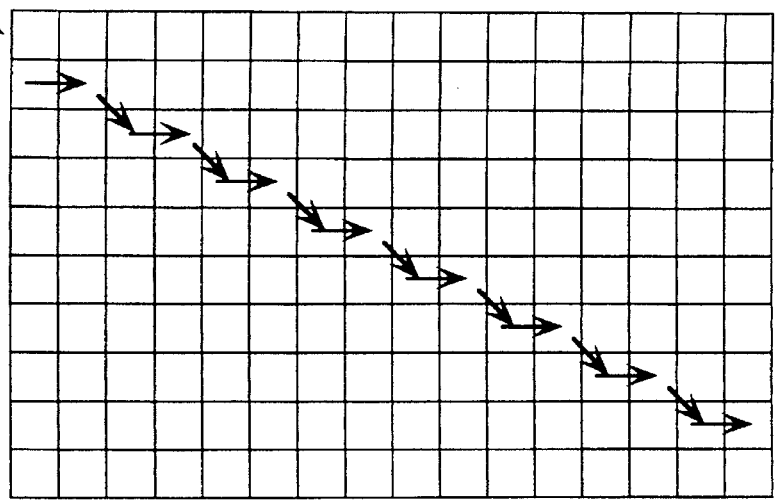
FIG. 8, consisting of FIGS. 8A–8B, illustrates a pixel sequence for creating output runs from an input image for an angle of rotation of 26.3 degrees.
Figure 8B:
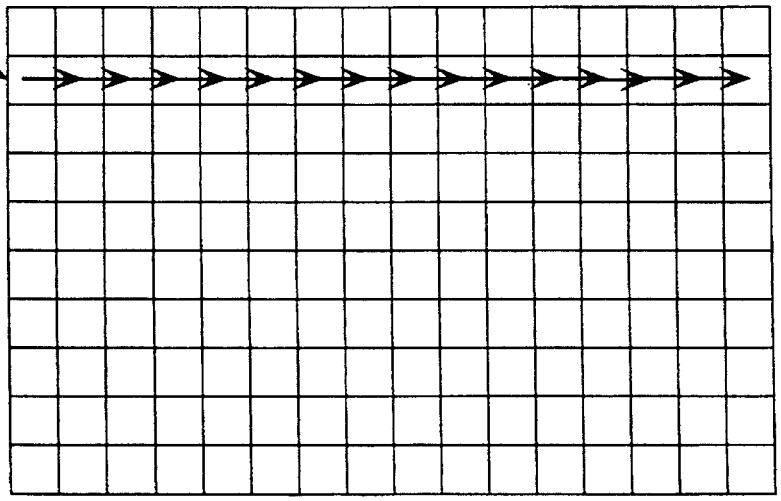

Referring now to FIGS. 4A and 8, in the next step 80, predefined information associated with the selected angle of rotation is retrieved from memory. The predefined information includes a linked list defining the pixel mapping sequence for processing the pixels of the input image into runs of the output image. FIG. 8 illustrates the pixel mapping sequence 82 for mapping pixels from the input plane into a run 84 in the output plane for an angle of rotation φ=26.3 degrees. It is noted that care must be taken to ensure that a pixel mapping sequence, when applied to create successive runs of the output image, covers all of the pixels of the input image. It will be appreciated that if the pixel mapping sequence begins at the same point in the linked list at the left edge of the input image, all of the pixels of the input image will be covered by successive pixel mapping sequences. In other words, the linked list must be "edge synchronized" when applied to particular pixels in the input plane. Referring back to FIG. 7, it is clear that edge synchronization of the angles of rotation illustrated in FIGS. 7C, 7D and 7E will similarly ensure that the pixel mapping sequence, when applied to create successive runs of the output image, will cover all of the pixels of the input image.

As discussed below, the runs of the output image will be scaled by $1/\cos^2(\phi)$ to preserve the aspect ratio of the output image. Therefore, the value of $1/\cos^2(\phi)$ for each angle of rotation is computed in advance and stored for retrieval during step 80. For example the value of $1/\cos^2(\phi)$ for φ=26.3 is 1.25. This value will be used as the scaling factor for the runs of the output image when the angle of rotation is φ=26.3.

Referring now to FIGS. 4A and 9, in the next step 90, the size of the new image is computed. FIG. 9 shows the mapping of the top and left edge pixels 92 from an input plane, shown in FIG. 9A, to an output plane, shown in FIG. 9B, for an angle of rotation φ=26.3. As shown in FIG. 9, the output plane requires more rows than the input plane. It will be appreciated that the additional number of rows is equal to the width of the input image times tan(φ), minus one if there is no remainder in the division.

Preferably, the new height is determined directly from the pixel mapping sequence for angle φ and the width of the input image. In step 94, arrays are defined and initialized for storing intermediate results and the final output image.

Referring now to FIGS. 4A, 4B and 6, program 30 next enters into a loop defined by steps 96 through 210 in which each pixel of the input image is sequentially processed in the row order and element order determined in step 60, as shown in FIG. 6. In step 96, program 30 gets the next run in row order, and in element order. In step 97 the run-length encoded table is decoded to determine the location of the pixels comprising the run in the input plane. In step 98, the first pixel of the run in element order is mapped to the output plane. In routine 100, the pixel is used to augment a run-length encoded output image. The method for mapping the pixel to the output plane and augmenting the run-length encoded output image is described with more particularity below with respect to routine 100 and FIG. 10. In step 200 it is determined whether there is another pixel in the run currently being processed. If the answer is "yes", the YES branch is followed back to step 98 and the next pixel in the run in element order is processed. If the answer is "no", the NO branch if followed to step 210, in which it is determined whether there is another run in the input image. If the answer is "yes", the YES branch is followed back to step 96 and the next run, in element order and in row order, is processed. If the answer is "no", the NO branch is followed to step 220 in which the start and end points of the output runs are scaled, and program 30 is concluded. The scaling of run endpoints is described with more particularity below with respect to routine 100 and FIG. 11. It is noted that the output runs may all be scaled at the end of pixel processing, as shown in FIG. 4C, or alternatively individual runs may be scaled as they are completed.

Referring now to FIGS. 4C and 9, FIG. 4C shows the steps of routine 100 for mapping pixels to the output plane and augmenting the run-length encoded output image. A starting point in the output plane, as well as a pixel mapping sequence, is required to map an input run to a series of pixel locations in an output plane. Routine 100 locates the starting point for mapping an input run by first mapping one or more edges (e.g., left edge and top edge) of the input plane into the output plane. At step 101 the locations in the output plane 92' of the edge pixels of the input plane 92 are determined. FIG. 9 illustrates the mapping of the input plane edge pixels to the output plane for an angle of rotation φ=26.3 degrees.

It is noted that the preferred embodiment of the present invention uses an orthogonal coordinate system and rectangular input and output planes. The left edge of the input plane is therefore a vertical straight line, and the top edge is a horizontal line. Recall that the linked list for the pixel sequence retrieved in step 80 provided the "rise" and "run" for mapping a horizontal line (e.g., an input run) from the input plane to the output plane. As illustrated in FIG. 9B, a vertical line in the input plane can also be mapped to the output plane by using the "rise" and "run" for mapping a horizontal line, but switching "rise" and "run". For example, as shown in FIG. 9B, the pixel sequence for mapping the top edge is "up two—over one", and the pixel mapping sequence for mapping the left edge is "up one—over two". Thus, a single edge pixel mapped to the output plane allows the entire edge to be easily mapped. It is noted that it is not necessary to map all of the edge pixels to the output plane; only those edge pixel for lines with foreground pixels (i.e., lines of the input plane with corresponding rows in the run-length encoded table of the input image) need to be mapped.

Using a corner pixel that serves as the pivot point for rotation provides a method for mapping the edge of the input plane without having to store any predefined pixel mapping locations. A corner pixel may be considered to have the same coordinate values in both the input and the output planes, although the output plane coordinates may be temporary. An edge of the input plane can then be mapped into the output plane by using the pixel mapping sequence and the corner pixel. The row numbers of the output plane may later be renumbered once the size of the output plane has been determined. For example, the pixel numbered "1" provides a corner pixel pivot point in FIG 9.

Figure 10A:
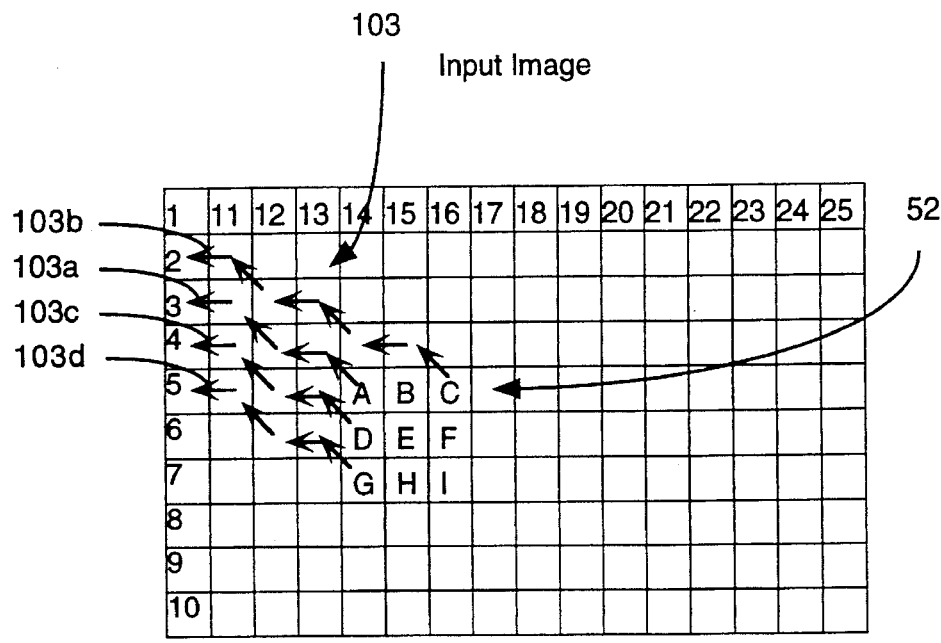
FIG. 10, consisting of FIGS. 10A–10B, illustrates a reverse pixel mapping technique for mapping intermediate output runs from an input image.

Referring now to FIGS. 4C, 8 and 10, in step 102, the pixel sequence is used to determine the row in which the pixel occurs in the output plane. As shown in FIG. 10A, the output row is determined by starting with the pixel location in the input plane 52, and following the reverse pixel sequence 103 back to an edge pixel. Recall that the pixel mapping path in the input image corresponds to a horizontal run in the output image, as shown in FIG. 8. The number of steps required to get from the pixel to an edge pixel (i.e., the "pixel distance") is then used to locate the pixel in the output plane. Specifically, the pixel is located in the output plane by starting at the edge pixel location in the output plane, and going horizontally the correct "pixel distance" 103'.

In step 104 it is determined whether the pixel being mapped is located adjacent to a previously mapped pixel in the same output run. This can be determined directly from the reverse pixel mapping sequence, and the locations in the input plane of the pixel being mapped and the previously mapped pixels. Specifically, it is determined by referring to the input plane, starting at the location of the pixel being mapped, following the reverse pixel sequence one step, and determining whether there is a foreground pixel located at that location. If the answer is "no", the NO branch is followed to step 106 in which the pixel is used to define the starting point of a run in the output image. If the answer is "yes", the YES branch is followed to step 107, in which the pixel is added to the previously established run that includes the adjacent pixel. Following step 107, routine 100 returns to step 220 shown on FIG. 4B.

Note that by edge synchronizing the reverse pixel sequences 103, all of the pixels of the input image are mapped back along a unique path. This reverse pixel mapping technique allows connectivity of pixels in output runs to be determined with reference to the input image, thus ensuring that each pixel maps to only one run in the output image. The creation of holes or artifacts in the output image is thereby avoided by the inventive method.

Note also that the runs of the output image are constructed by reference to the input image using the reverse pixel mapping sequence. Specifically, a pixel is added to an output run if the preceding step in the reverse pixel sequence points to a foreground pixel. To directly create the output run-length encoded table, it is necessary that the preceding pixel have been previously entered into the output run-length encoded table. It will be appreciated that all angles of rotation from zero to 90 degrees have reverse pixel mapping sequences that point up and to the left. Therefore, selecting the order for reading the input run-length encoded table to effect rotation to a different quadrant (i.e., so as to cause the output image to "sweep" from left to right as described with reference to FIG. 6) allows direct construction of the output runs using the reverse pixel mapping technique described by routine 100.

Figure 10B:
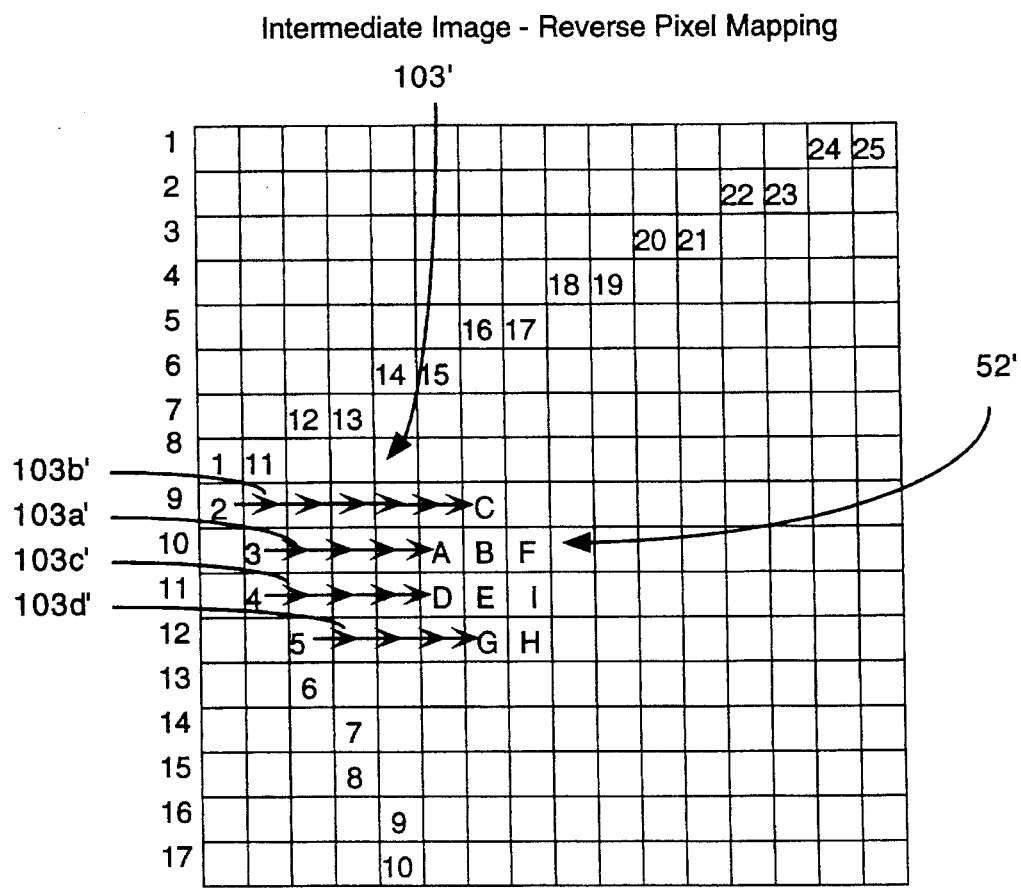

The reverse pixel mapping technique described by routine 100 will be more clearly understood by following the steps required to map the simple input image 52 to an intermediate image 52' which is rotated by φ=26.3 degrees, as illustrated by FIG. 10. Referring to FIG. 10A, the point "A" is reverse mapped in the input plane to edge pixel "3" a pixel distance of 4, as illustrated by reverse pixel sequence 103a. Referring to FIG. 10B, pixel "A" is then located in the output plane by starting at mapped edge pixel "3", and going a pixel distance of 4 horizontally, as illustrated by pixel mapping sequence 103a'. It is determined from reverse pixel mapping sequence 103a that pixel "A" is not adjacent to a previously mapped pixel in an output run. Thus, pixel "A" defines the starting pixel of a run in row 10 of the output image.

Referring to FIG. 10A, pixel "B" is next reverse mapped in the input plane to edge pixel "3" by a pixel distance of 5, as illustrated by reverse pixel sequence 103a augmented with a step from pixel "A" to pixel "B". Referring to FIG. 10B, pixel "B" is then located in the output plane by starting at mapped edge pixel "3", and going a pixel distance of 5 horizontally. It is determined from reverse pixel mapping sequence 103a that pixel "B" is located adjacent to a previously mapped pixel in an output run (i.e., pixel "A"). Thus, pixel "B" is added to the previously established run in row 10 of the output image (i.e., forming partial run A to B in the output image).

Note that direct construction of the run requires that pixel "A" have been previously recorded in the run. For angles of rotation greater than 90 degrees, this is ensured by selecting the order for reading the input run-length encoded table as described with reference to FIG. 6.

Referring to FIG. 10A, pixel "C" is next reverse mapped in the input plane to edge pixel "2" a pixel distance of 6, as illustrated by reverse pixel sequence 103b. Referring to FIG. 10B, pixel "C" is then located in the output plane by starting at mapped edge pixel "2", and going a pixel distance of 6 horizontally, as illustrated by pixel mapping sequence 103b'. It is determined from reverse pixel mapping sequence 103b that pixel "C" is not adjacent to a previously mapped pixel in an output run. Thus, point "C" defines the starting point of a run in row 9 of the output image.

Referring to FIG. 10A, pixel "D" is next reverse mapped in the input plane to edge pixel "4" a pixel distance of 4, as illustrated. by reverse pixel sequence 103c. Referring to FIG. 10B, pixel "D" is then located in the output plane by starting at mapped edge pixel "4", and going a pixel distance of 4 horizontally, as illustrated by pixel mapping sequence 103c'. It is determined from reverse pixel mapping sequence 103c that pixel "D" is not adjacent to a previously mapped pixel in an output run. Thus, point "D" defines the starting point of a run in row 11 of the output image.

Referring to FIG. 10A, pixel "E" is next reverse mapped in the input plane to edge pixel "4" a pixel distance of 5, as illustrated by reverse pixel sequence 103c augmented with a step from pixel "D" to pixel "E".

Referring to FIG. 10B, pixel "E" is then located in the output plane by starting at mapped edge pixel "4", and going a pixel distance of 5 horizontally. It is determined from reverse pixel mapping sequence 103c that pixel "E" is located adjacent to a previously mapped pixel in an output run (i.e., pixel "D"). Thus, pixel "E" is added to the previously established run in row 11 of the output image (i.e., forming partial run D to E in the intermediate image). Note that direct construction of the run requires that pixel "D" have been previously recorded in the run.

Referring to FIG. 10A, pixel "F" is next reverse mapped in the input plane to edge pixel "3" a pixel distance of 6, as illustrated by reverse pixel sequence 103a augmented with a step from pixel "A" to pixel "B" and a second step from "B" to "F". Referring to FIG. 10B, pixel "F" is then located in the output plane by staging at mapped edge pixel "3", and going a pixel distance of 6 horizontally. It is determined from reverse pixel mapping sequence 103a that pixel "F" is located adjacent to a previously mapped pixel in an output run (i.e., pixel "B"). Thus, pixel "F" is added to the previously established run in row 10 of the output image (i.e., now forming run A to F in the output image). Note that direct construction of the run requires that pixels "A" and "B" have been previously recorded in the run.

Referring to FIG. 10A, pixel "G" is next reverse mapped in the input plane to edge pixel "5" a pixel distance of 4, as illustrated by reverse pixel sequence 103d. Referring to FIG. 10B, pixel "G" is then located in the output plane by starting at mapped edge pixel "5", and going a pixel distance of 4 horizontally, as illustrated by pixel mapping sequence 103d'. It is determined from reverse pixel mapping sequence 103d that pixel "G" is not adjacent to a previously mapped pixel in an output run. Thus, point "G" defines the starting point of a run in row 12 of the output image.

Referring to FIG. 10A, pixel "H" is next reverse mapped in the input plane to edge pixel "5" a pixel distance of 5, as illustrated by reverse pixel sequence 103d augmented with a step from pixel "G" to pixel "H". Referring to FIG. 10B, pixel "H" is then located in the output plane by starting at mapped edge pixel "5", and going a pixel distance of 5 horizontally. It is determined from reverse pixel mapping sequence 103d that pixel "H" is located adjacent to a previously mapped pixel in an output run (i.e., pixel "G"). Thus, pixel "H" is added to the previously established run in row 12 of the output image (i.e., now forming run G to H in the output image). Note that direct construction of the run requires that pixel "G" have been previously recorded in the run.

Finally, referring to FIG. 10A, pixel "I" is next reverse mapped in the input plane to edge pixel "4" a pixel distance of 6, as illustrated by reverse pixel sequence 103c augmented with a step from pixel "D" to pixel "E" and a second step from "E" to "I". Referring to FIG. 10B, pixel "I" is then located in the output plane by starting at mapped edge pixel "4", and going a pixel distance of 6 horizontally. It is determined from reverse pixel mapping sequence 103c that pixel "I" is located adjacent to a previously mapped pixel in an output run (i.e., pixel "E"). Thus, pixel "I" is added to the previously established run in row 11 of the output image (i.e., now forming run D to I in the output image). Note that direct construction of the run requires that pixels "D" and "E" have been previously recorded in the run.

In the final step 220, the final output image is created by scaling the start and end points of the intermediate image by a scaling factor, preferably $1/\cos^2(\phi)$. Scaling is required in the preferred embodiment of the present invention because the pixelized image captured by the inventive system can be thought of as being laid out in an orthogonal two dimensional grid, with one pixel located at each intersection of grid lines. Thus, the pixels are laid out in a square pattern, with one pixel in each corner of the square. It is noted that the diagonal distance across a square is longer than the side of the square. Specifically, the distance between adjacent pixels in a diagonal direction is the square root of two times greater than in a direction along a side. Therefore, rotating an image by using the pixel mapping sequence described above would cause distortion in the aspect ratio of the rotated image.

For example, rotating a line segment that is five pixels long from zero degrees to 45 degrees causes the length of the line to be expanded by the square root of two. This is clear because five squares lined up corner to corner create a longer line than five squares lined up side to side. Thus, the rotated line including five pixels lined up diagonally will appear to be approximately as long as seven pixels lines up side to side. Similarly, rotating a line from 45 degrees to zero degrees causes the length of the line to be reduced by the square root of two.

In general, mapping pixels from an orthogonal grid input plane to an orthogonal grid output plane causes distortion in the aspect ratio of the rotated image. More specifically, rotating a line from zero degrees by an angle $\phi$ expands the length of the line by the larger of the inverse $\cos(\phi)$ or inverse $\sin(\phi)$. Similarly, rotating a line from an angle $\phi$ to a horizontal line reduces the length of the line by the larger of $\cos(\phi)$ or $\sin(\phi)$. It will be appreciated that rotating an image within a quadrant can be accomplished by rotating an image by an angle between zero and 45 degrees and then adding or subtracting a multiple of 90 degrees as required. Therefore, only angles $\phi$ with $\cos(\phi)$ larger than $\sin(\phi)$ need to be considered.

Consider the mapping of a pixelized image from an input image plane to an output image plane, wherein each plane is laid out on an orthogonal grid, and wherein the mapping performs a rotation by an angle $\phi$ between zero and 45 degrees. Note that a horizontal line in the output plane is mapped from a line at angle $-\phi$ in the input plane, as shown in FIG. 8. Therefore, a horizontal line in the output image (i.e., the rotated image) is reduced in length $\cos(\phi)$. Note also that a line in the output plane at angle $\phi$ is mapped from a horizontal line in the input image, as shown in FIG. 7. Thus, a line at angle $\phi$ in the output image is expanded in length by the inverse of $\cos(\phi)$. Therefore, it will be appreciated that a pixelized image mapped from the input plane to the output plane will be simultaneously reduced by $\cos(\phi)$ in the horizontal direction, and expanded by the inverse of $\cos(\phi)$ along a line at angle $\phi$.

Recall that the inventive method is used to map run-length encoded images, and that runs are horizontal line segments of foreground pixels. It will therefore be appreciated that pixel mapping to rotate an input image by angle φ causes the output runs to be reduced in length by cos(φ), while lines at angle φ in the output image (i.e., input runs) are expanded by the inverse of cos(φ). Accordingly, step 220 of the inventive method scales (i.e., expands) the output runs by the inverse of $\cos^2(\phi)$ to restore the aspect ratio of the output image.

Figures 11A, 11B:
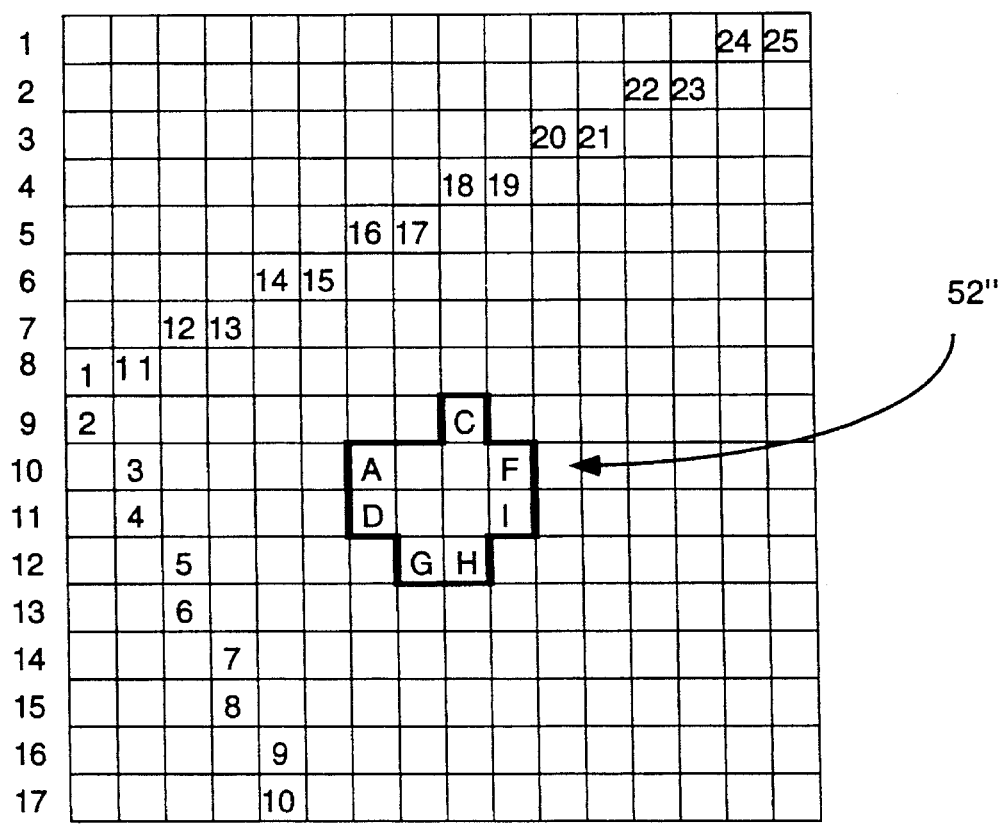
FIG. 11, consisting of FIGS. 11A–11B, illustrates scaling intermediate output runs to produce a final output image.

Step 220 for the example described above, rotating image 52 by φ=26.3 degrees, is illustrated by FIG. 11. It will be appreciated that the scaling factor, $1/\cos^2(\phi)$ for φ=26.3 degrees, is 1.25. FIG. 11A shows the computation of the scaled pixel distance for each start and end point of the intermediate image. FIG. 11B shows the final output image 52" as formed by the scaled runs mapped to the output plane.

It is noted that the scaling factor is determined by the geometric configuration of the input pixel grid, which is determined by the physical arrangement of the pixels in the CCD camera 22 and the operation of controller/converter 24. For example, in an alternative embodiment of the present invention the scaling step is unnecessary because CCD camera 22 and the operation of controller/converter 24 are designed so as to produce an input pixel grid in which each pixel is equidistant from each adjacent pixel. It is noted that this modification results in the input pixel grid being laid out in a hexagonal pattern, rather than in a square pattern as in the previously described embodiment.

It should be understood that the foregoing relates only to the preferred embodiment of the present invention, and that numerous changes may be made therein without departing from the spirit and scope of the invention as defined by the following claims.

What is claimed is:

1. A method of obtaining output image data representing an output image from input image data representing an input image, the output image and the input image each representing lines of pixels, the output image being a rotated version of the input image, the input image data comprising rows of elements, each element representing at least one pixel of the input image, comprising the steps of:

selecting a quadrant of rotation;

selecting a rotation angle from a pre-defined set of rotation angles;

in response to said rotation angle, retrieving a predefined pixel mapping sequence for mapping pixels of the input image to pixels of the output image;

in response to said quadrant of rotation, selecting a row order in which to read the rows of the input image data;

in response to said quadrant of rotation, selecting an element order in which to read the elements of each row of the input image data; and mapping the input image data to the output image data in said row order, and within each row in said element order, in accordance with said pixel mapping sequence.

2. The method of claim 1, wherein said mapping step comprises reverse pixel mapping, and wherein each element represents individual pixels, or runs of pixels, of the input image.

3. The method of claim 1, wherein the rows of the input image data correspond to lines of the input image, and wherein the elements of the input image data correspond to pixels of the input image, further comprising the step of, after mapping pixels within each line of the input image, and prior to mapping pixels within a subsequent line of the input image, augmenting a run-length encoded output image comprising one or more output runs so as to incrementally construct the run-length encoded output image.

4. The method of claim 3, wherein said step of augmenting a run-length encoded output image comprises the steps of:

determining whether each pixel mapped to the output image is located adjacent to a previously mapped pixel in the same line of the output image;

if a mapped pixel is located adjacent to a previously mapped pixel in the same line of the output image, adding the mapped pixel to an output run comprising the previously mapped pixel; and if a mapped pixel is not located adjacent to a previously mapped pixel in the same line of the output image, defining a new output run starting with the mapped pixel.

5. The method of claim 4, further comprising the steps of:

in response to said rotation angle, retrieving predefined scaling factor; and scaling the output runs by said scaling factor.

6. The method of claim 1, wherein each row of the input image data corresponds to a line of the input image, and wherein the elements within a row of the input image data define one or more input runs, further comprising the step of, after mapping the pixels defining each input run and prior to mapping the pixels defining a subsequent input run, augmenting a run-length encoded output image comprising one or more output runs so as to incrementally construct the run-length encoded output image.

7. The method of claim 6, wherein said step of augmenting a run-length encoded output image comprises the steps of:

determining whether each pixel mapped to the output image is located adjacent to a previously mapped pixel in the same line of the output image;

if a mapped pixel is located adjacent to a previously mapped pixel in the same line of the output image, adding the mapped pixel to an output run comprising the previously mapped pixel; and if a mapped pixel is not located adjacent to a previously mapped pixel in the same line of the output image, defining a new output run starting with the mapped pixel.

8. The method of claim 7, further comprising the steps of:

in response to said angle of rotation, retrieving a predefined scaling factor; and scaling the output runs by said scaling factor.

9. The method of claim 8, wherein said mapping step comprises reverse pixel mapping.

10. A method of obtaining a run-length encoded output image comprising one or more output runs from a run-length encoded input image comprising one or more input runs, the run-length encoded output image representing an output image comprising lines of pixels, the run-length encoded input image representing an input image comprising lines of pixels, the output image being a rotated version of the input image, the run-length encoded input image comprising rows of elements wherein each row corresponds to a line of the input image, the run-length encoded output image comprising rows of elements wherein each row corresponds to a line of the output image, each element representing at least one pixel of the input image, comprising the steps of:

selecting a quadrant of rotation;

selecting a rotation angle from a pre-defined set of rotation angles;

in response to said rotation angle, retrieving a predefined pixel mapping sequence for mapping pixels of the input image to pixels of the output image;

in response to said quadrant of rotation, selecting a row order in which to read the rows of the run-length encoded input image;

in response to said quadrant of rotation, selecting an element order in which to read the elements of each row of the run-length encoded input image; and processing the elements of the run-length encoded input image in said row order, and within each row in said element order.

11. The method of claim 11, wherein said processing step comprises reverse pixel mapping, and wherein each element represents individual pixels, or runs of pixels, of the input image.

12. The method of claim 10, wherein said processing step comprises the steps of:

determining the location in the input image of the pixels comprising an input run; and mapping the pixels comprising the input run to the output image in accordance with said pixel mapping sequence.

13. The method of claim 12, wherein the first pixel of a plurality of consecutive lines of the input image define an edge of the input image, and wherein the step of determining the location in the output image of the pixels comprising the input runs comprises the steps of:

in response to said rotation angle, determining pixel locations in the output image corresponding to the edge; and determining the location of input image pixels in the output image in relation to the pixel locations in the output image corresponding to the edge.

14. The method of claim 13, wherein said step of determining the location of input image pixels in the output image comprises reverse pixel mapping.

15. The method of claim 14, further comprising the step of, after processing the elements defining each input run and prior to processing the elements defining a subsequent input run, augmenting the run-length encoded output image so as to incrementally construct the run-length encoded output image.

16. The method of claim 15, wherein said step of augmenting the run-length encoded image comprises the steps of:

determining whether each pixel mapped to the output image is located adjacent to a previously mapped pixel in the same line of the output image;

if a mapped pixel is located adjacent to a previously mapped pixel in the same line of the output image, adding the mapped pixel to an output run comprising the previously mapped pixel; and if a mapped pixel is not located adjacent to a previously mapped pixel in the same line of the output image, defining a new output run starting with the mapped pixel.

17. The method of claim 16, wherein said step of determining whether each pixel mapped to the output image is located adjacent to a previously mapped pixel in the same line of the output image comprises reverse pixel mapping.

18. The method of claim 17, further comprising the steps of:

in response to said rotation angle, retrieving predefined scaling factor; and scaling the output runs by said scaling factor.

19. An apparatus for obtaining a run-length encoded output image comprising one or more output runs from a run-length encoded input image comprising one or more input runs, the run-length encoded output image representing an output image comprising lines of pixels, the run-length encoded input image representing an input image comprising lines of pixels, the output image being a rotated version of the input image, the run-length encoded input image comprising rows of elements wherein each row corresponds to a line of the input image, the run-length encoded output image comprising rows of elements wherein each row corresponds to a line of the output image, each element representing at least one pixel of the input image, comprising:

means for selecting a quadrant of rotation;

means for selecting a rotation angle from a pre-defined set of rotation angles;

means for, in response to said rotation angle, retrieving a predefined pixel mapping sequence for mapping pixels of the input image to pixels of the output image;

means for, in response to said quadrant of rotation, selecting a row order in which to read the rows of the run-length encoded input image;

means for, in response to said quadrant of rotation, selecting an element order in which to read the elements of each row of the run-length encoded input image; and means for processing the elements of the run-length encoded input image in said row order, and within each row in said element order.

20. The apparatus of claim 19, wherein said means for processing comprises means for reverse pixel mapping, and wherein each element represents individual pixels, or runs of pixels, of the input image.

21. The apparatus of claim 19, wherein said means for processing comprises means for:

determining the location in the input image of the pixels comprising an input run; and mapping the pixels comprising the input run to the output image in accordance with said pixel mapping sequence.

22. The apparatus of claim 21, wherein the first pixel of a plurality of consecutive lines of the input image define an edge of the input image, and wherein the means for determining the location in the output image of the pixels comprising the input runs comprises means for:

in response to said rotation angle, determining pixel locations in the output image corresponding to the edge; and determining the location of input image pixels in the output image in relation to the pixel locations in the output image corresponding to the edge.

23. The apparatus of claim 22, further comprising the means for, after processing the elements defining each input run and prior to processing the elements defining a subsequent input run, augmenting the run-length encoded output image so as to incrementally construct the run-length encoded output image.

24. The apparatus of claim 23, wherein said means for augmenting the run-length encoded image comprises means for:

determining whether each pixel mapped to the output image is located adjacent to a previously mapped pixel in the same line of the output image;

if a mapped pixel is located adjacent to a previously mapped pixel in the same line of the output image, adding the mapped pixel to an output run comprising the previously mapped pixel; and if a mapped pixel is not located adjacent to a previously mapped pixel in the same line of the output image, defining a new output run starting with the mapped pixel.

25. The apparatus of claim 24, further comprising means for:

in response to said rotation angle, retrieving predefined scaling factor; and scaling the output runs by said scaling factor.

26. A storage medium comprising a computer program providing a method of obtaining a run-length encoded output image comprising one or more output runs from a run-length encoded input image comprising one or more input runs, the run-length encoded output image representing an output image comprising lines of pixels, the run-length encoded input image representing an input image comprising lines of pixels, the output image being a rotated version of the input image, the run-length encoded input image comprising rows of elements wherein each row corresponds to a line of the input image, the run-length encoded output image comprising rows of elements wherein each row corresponds to a line of the output image, each element representing individual pixels, or runs of pixels, of the input image, comprising the steps of:

selecting a quadrant of rotation;

selecting a rotation angle from a pre-defined set of rotation angles;

in response to said rotation angle, retrieving a predefined pixel mapping sequence for mapping pixels of the input image to pixels of the output image;

in response to said quadrant of rotation, selecting a row order in which to read the rows of the run-length encoded input image;

in response to said quadrant of rotation, selecting an element order in which to read the elements of each row of the run-length encoded input image; and processing the elements of the run-length encoded input image in said row order, and within each row in said element order.

27. The storage medium of claim 26, wherein said processing step comprises reverse pixel mapping.

28. The storage medium of claim 26, wherein said processing step comprises the steps of:

determining the location in the input image of the pixels comprising an input run; and mapping the pixels comprising the input run to the output image in accordance with said pixel mapping sequence.

29. The storage medium of claim 28, wherein the first pixel of a plurality of consecutive lines of the input image define an edge of the input image, and wherein the step of determining the location in the output image of the pixels comprising the input runs comprises the steps of:

in response to said rotation angle, determining pixel locations in the output image corresponding to the edge; and determining the location of input image pixels in the output image in relation to the pixel locations in the output image corresponding to the edge.

30. The storage medium of claim 29, wherein said method further comprises the step of, after processing the elements defining each input run and prior to processing the elements defining a subsequent input run, augmenting the run-length encoded output image so as to incrementally construct the run-length encoded output image.

31. The storage medium of claim 30, wherein said step of augmenting the run-length encoded image comprises the steps of:

determining whether each pixel mapped to the output image is located adjacent to a previously mapped pixel in the same line of the output image;

if a mapped pixel is located adjacent to a previously mapped pixel in the same line of the output image, adding the mapped pixel to an output run comprising the previously mapped pixel; and if a mapped pixel is not located adjacent to a previously mapped pixel in the same line of the output image, defining a new output run starting with the mapped pixel.

32. The storage medium of claim 31, wherein said method further comprises the steps of:

in response to said rotation angle, retrieving a predefined scaling factor; and scaling the output runs by said scaling factor.

* * * * *